US006646898B2

(12) United States Patent
Furukawa et al.

(10) Patent No.: US 6,646,898 B2
(45) Date of Patent: Nov. 11, 2003

(54) RESONANT INVERTER APPARATUS

(75) Inventors: Katsuhiko Furukawa, Utsunomiya (JP); Sadao Shinohara, Utsunomiya (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/166,767

(22) Filed: Jun. 12, 2002

(65) Prior Publication Data
US 2003/0002309 A1 Jan. 2, 2003

(30) Foreign Application Priority Data
Jul. 2, 2001 (JP) ..................... P2001-201050

(51) Int. Cl.$^7$ ................ H02M 5/451; H02M 7/5387
(52) U.S. Cl. ............... 363/132; 363/37; 307/77
(58) Field of Search ............... 363/132, 131, 363/127, 98, 97, 89, 69, 70, 37; 307/77, 80, 82; 318/268, 434, 802

(56) References Cited

U.S. PATENT DOCUMENTS

| | | | | |
|---|---|---|---|---|
| 4,707,774 A | * | 11/1987 | Kajita | 363/37 |
| 4,864,483 A | * | 9/1989 | Divan | 363/37 |
| 4,965,709 A | * | 10/1990 | Ngo | 363/37 |
| 5,038,267 A | * | 8/1991 | De Doncker et al. | 363/89 |
| 5,460,244 A | * | 10/1995 | Tanahashi | 187/293 |
| 5,559,685 A | * | 9/1996 | Lauw et al. | 363/37 |

* cited by examiner

Primary Examiner—Rajnikant B. Patel
(74) Attorney, Agent, or Firm—Arent Fox Kintner Plotkin & Kahn, PLLC

(57) ABSTRACT

The invention provides a resonant inverter apparatus that allows making the number of sensors small and reducing the cost. In an inverter apparatus comprising an inverter circuit 2A, a resonant circuit 2B, and a control circuit 3, a three phase main circuit, capacitors C1 to C6, and load current sensors Is1 to Is3 are provided in the inverter circuit, a three phase auxiliary circuit and inductor Lr are provided in the resonant circuit, a resonant current arrival determining device 7 and a drive signal generating device 6 are provided in the control circuit, and a maximum value detecting device 12 that detects the absolute value of the maximum value of the load current, a counter setting value output device 13 that outputs the counter setting value that depends on the absolute value of the maximum value of the load current, and a count calculating device 14 that outputs the arrival determination signal after the passage of a time interval that depends on the counter setting value output by the counter setting value output device after the drive signal generating device outputs a predetermined switching timing signal are provided in the resonant current arrival determining device.

7 Claims, 22 Drawing Sheets

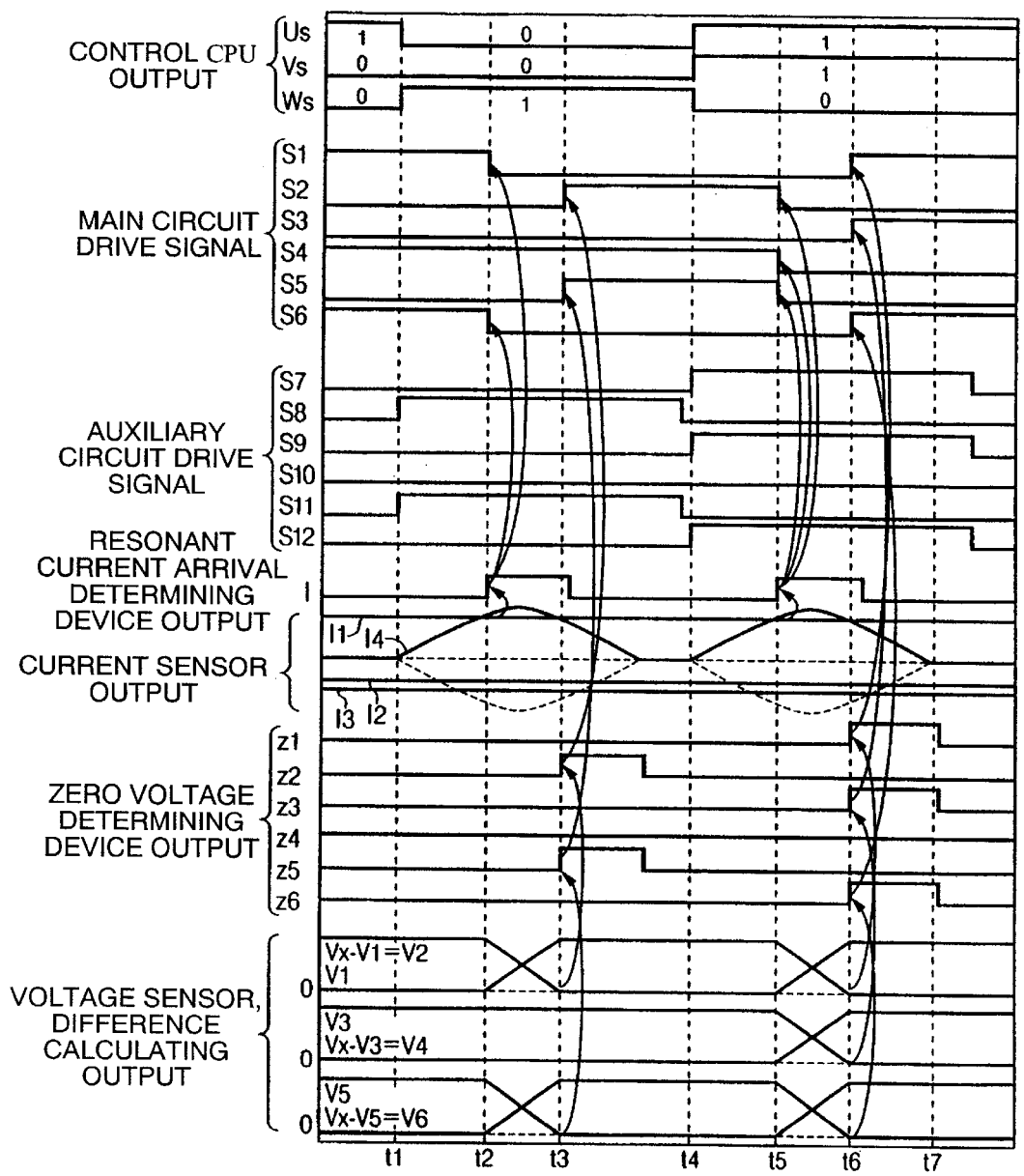

Fig. 4A MODE1
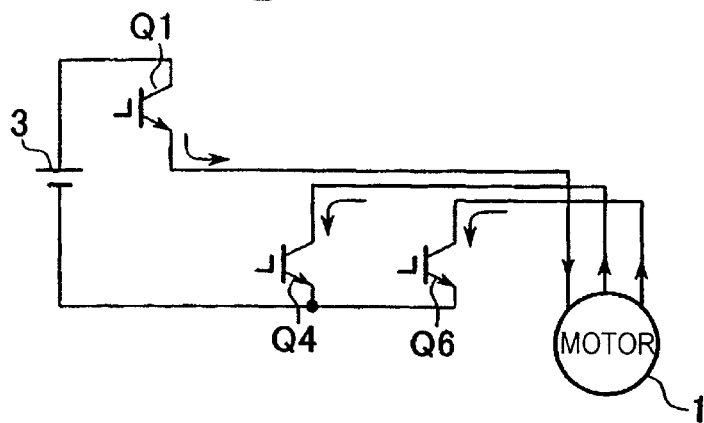
Fig. 4B MODE2
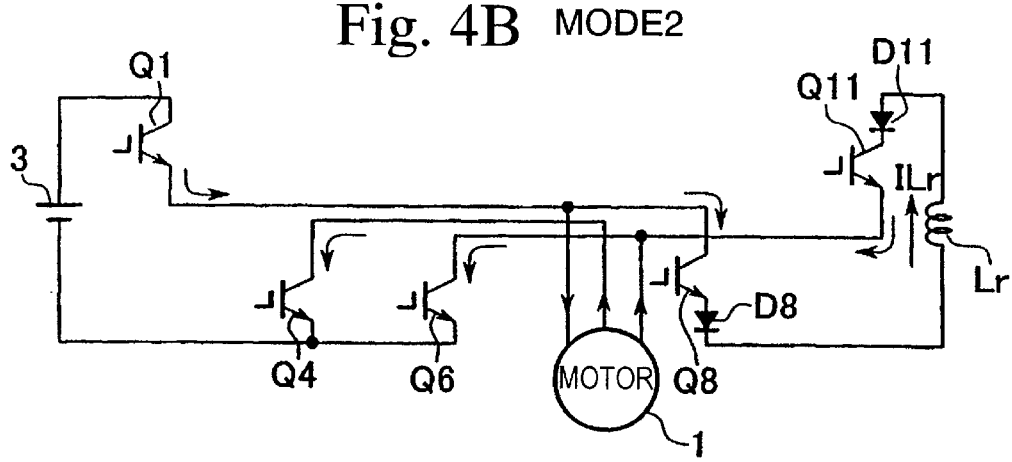
Fig. 4C MODE3
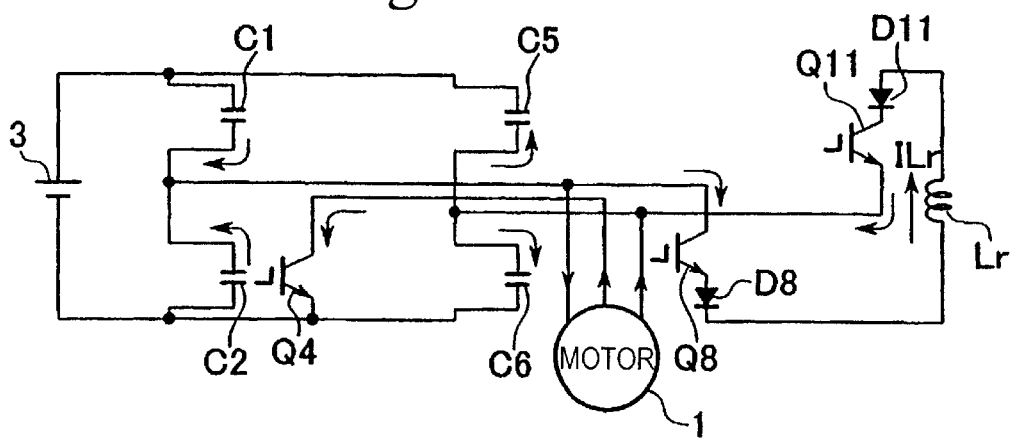

Fig. 4D MODE4
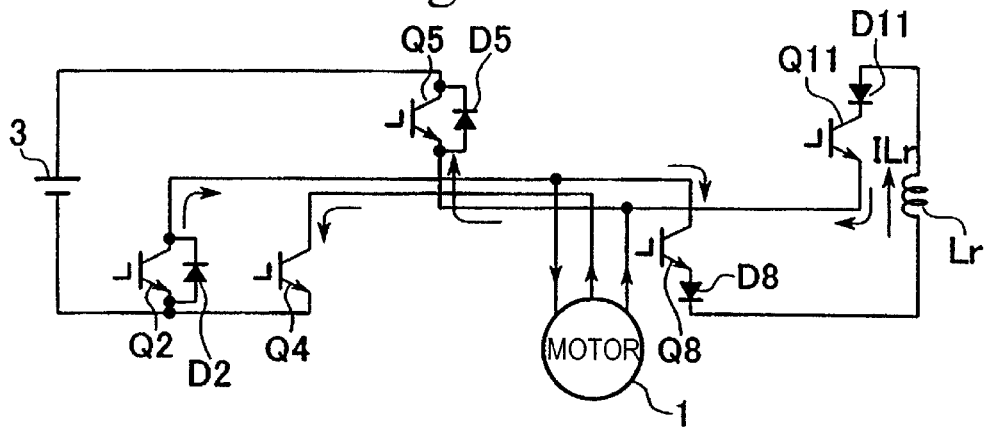
Fig. 4E MODE5
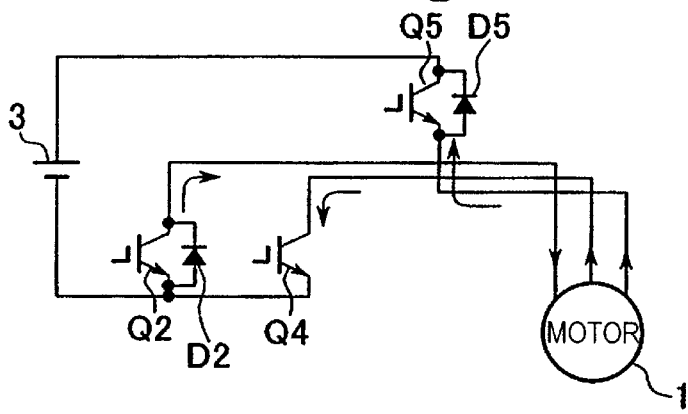
Fig. 4F MODE6
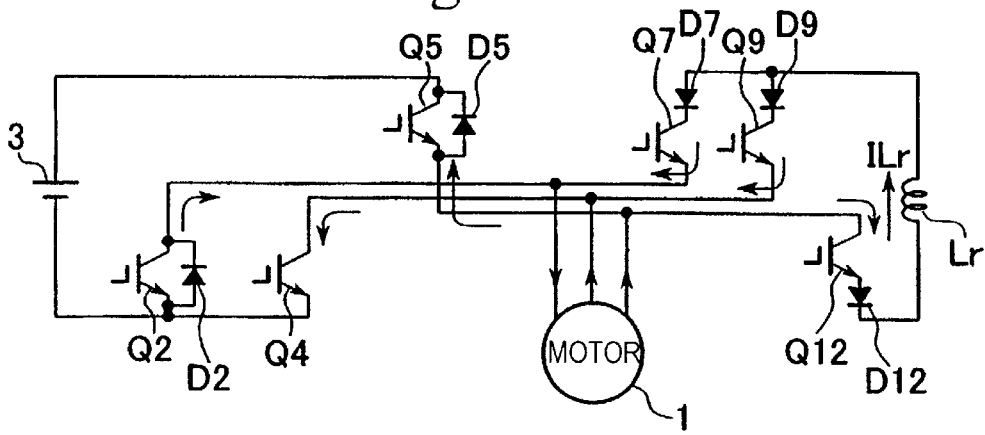

Fig. 4G MODE7
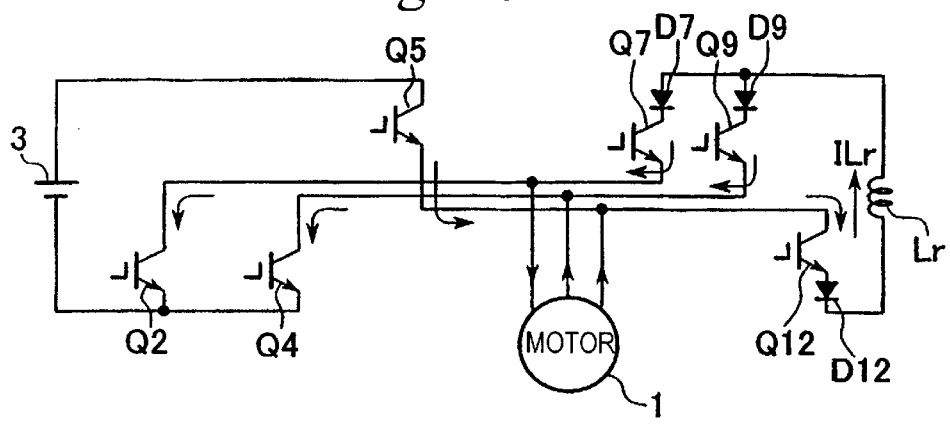
Fig. 4H MODE8
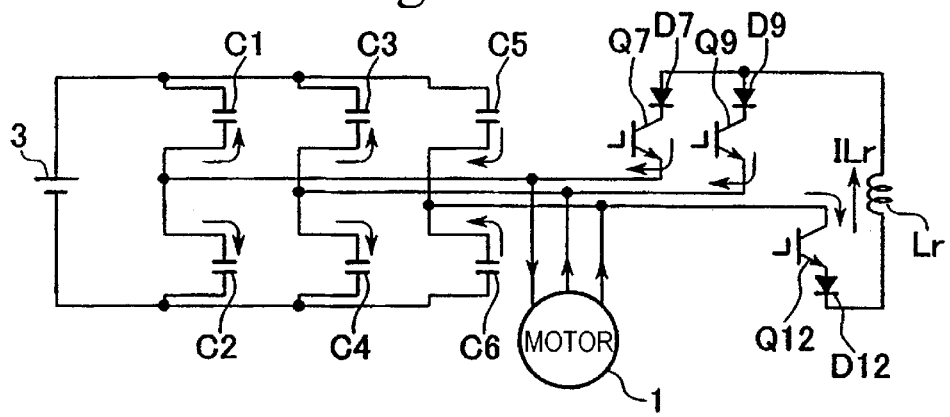
Fig. 4I MODE9
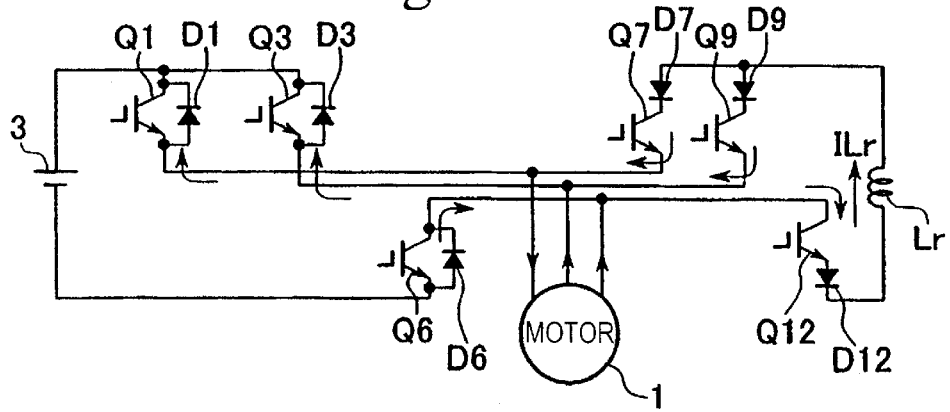

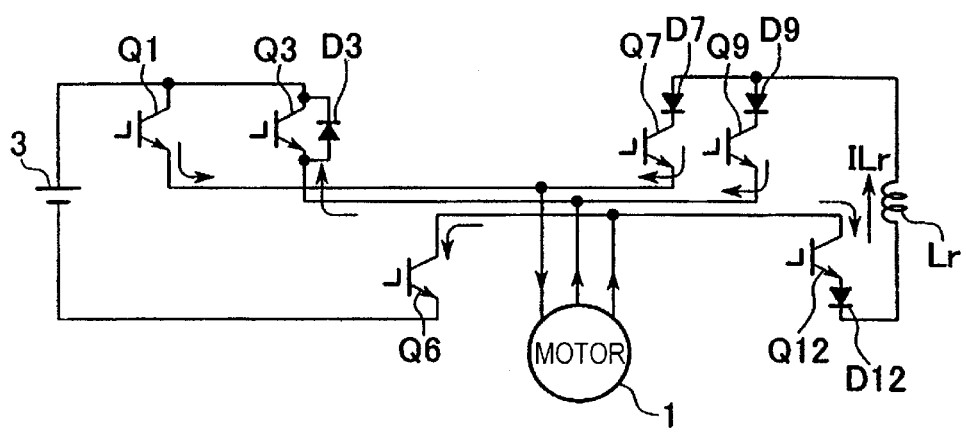
Fig. 4J MODE10

RESONANT INVERTER APPARATUS

BACKGROUND OF THE INVENTION

1. Field of the Invention

The present invention relates to an inverter apparatus that drives an electric motor for electrical vehicles (EV) that are driven by an electric motor, hybrid electric vehicles (HEV) that are driven using a combustion engine and an electric motor, or the like, and in particular, relates to a resonant inverter apparatus that carries out soft switching using a resonant circuit.

2. Description of the Related Art

FIG. 19 is a circuit diagram showing the structure of a collective resonant snubber inverter apparatus. The conventional resonant inverter requires six cross-terminal voltage sensors Vs1, Vs3, and Vs5, and Vs2, Vs4, and Vs6 that detect the cross-terminal voltages V1, V3, and V5, and V2, V4, and V6 of the plus side main switching elements Q1, Q3, and Q4, and minus side main switching elements Q2, Q4, and Q6; a zero voltage detecting device 8 that detects whether or not the cross-terminal voltages, V1, V3, and V5, and V2, V4, and V6 that have been detected by the cross terminal voltage sensors Vs1, Vs3, and Vs5, and Vs2, Vs4, and Vs6 are zero; a resonant current sensor Is4 that detects the resonant current I4 flowing into the resonant inductor Lr; load current sensors Is1, Is2, and Is3 that detect the load currents I1, I2, and I3 that flow into the motor (load) 1, and a resonant current arrival determining device 7 that determines whether or not the resonant current I4 is larger than a maximum value among the load currents I1, I2, and I3.

However, in the conventional technology described above, because there are a large number of sensors, there are the problems that the circuit structure becomes complex, and this is also disadvantageous in terms of cost.

In consideration of the problems described above, it is an object of the present invention to provide a resonant inverter apparatus that can make the number of sensors small and reduce the cost.

SUMMARY OF THE INVENTION

A first aspect of the present invention is an inverter apparatus comprising an inverter circuit (for example, the main circuit 2A in the embodiments) that supplies a direct current output by a power source (for example, the direct current source VB in the embodiments) to a motor (for example, motor 1 in the embodiments) after being converted to three-phase alternating current; a resonant circuit (for example, auxiliary circuit 2B in the embodiments) that is connected to the output terminal of the inverter circuit; and a control circuit (for example, control circuit 3 in the embodiments) that controls the resonant circuit and the inverter circuit. The inverter circuit comprises a three phase main circuit in which three main circuits, one for each phase (for example, the main circuit for the 2U phase in the embodiments) are connected in parallel, wherein, in a main circuit, a plus side main switching element (for example, the plus side main switching element Q1 in the embodiments) that is connected to the plus terminal of the power source and the minus side main switching elements (for example, the minus switching element Q2 in the embodiments) that is connected to the minus terminal of the power source are connected in series, and the plus side switching element and the minus side switching element are connected in parallel to diodes (for example, the diodes D1 and D2 in the embodiments); resonant capacitors (for example, the capacitors C1 to C6 in the embodiments) that are connected in parallel to the plus side main switching element and the minus side main switching element in each circuit for each phase; and load current sensors (for example, the load current sensors Is1, Is2, and Is3 in the embodiments) that detect a load current (for example, I1, I2, and I3 in the embodiments) flowing between main connection points (for example, the main connection points PSU, PSV, and PSW in the embodiments), at which the plus side main switching element and the minus side main switching element in each circuit for each phase are connected together, and the motor. The resonant circuit comprises a three-phase auxiliary circuit in which three auxiliary circuits, one for each phase (for example, the auxiliary circuit for the phase 3U in the embodiments), are connected in parallel, wherein, in an auxiliary circuit, the outflow auxiliary switching elements (for example, the outflow auxiliary switching element block B7 in the embodiments) and the inflow auxiliary switching elements (for example, the outflow auxiliary switching element block B8 in the embodiments) that allow a current to pass only in one direction are connected serially, and the auxiliary connection points (for example, the auxiliary connection points PHU, PHV, and PHW in the embodiments) that connect the outflow auxiliary switching elements and the inflow auxiliary switching elements in each auxiliary circuit for each phase are connected to the main connection points; and a resonant inductor (for example, the inductor Lr in the embodiments) that is connected in parallel to the auxiliary circuits for each phase. The control circuit comprises a resonant current arrival determining device (for example, the resonant current arrival determination device 7 in the embodiment) that determines whether or not the resonant current (for example, the resonant current I4 in the embodiments) in the resonant circuit is larger than the load current detected by the load current sensor, and in the case that it is larger, outputs an arrival determination signal (for example, the arrival determination signal I in the embodiments); a drive signal generating device (for example, the drive signal generating device 6 in the embodiments) that generates a main drive signal (for example, the main drive signals S1 to S6 in the embodiments) that turns OFF the plus side main switching elements and the minus side switching elements when the resonant current arrival determining device has output an arrival determination signal, generates an auxiliary drive signal (for example, the auxiliary drive signals S7 to S12 in the embodiments) that turns ON the corresponding outflow side auxiliary switching element and the inflow side auxiliary switching element in the resonant circuit at a predetermined timing, and generates an auxiliary drive signal that turns OFF the outflow side auxiliary switching element and the inflow side auxiliary switching element auxiliary switching element after a predetermined ON continuation time has passed from the redefined switching timing. A resonant current arrival determining device comprising a maximum value detecting device (for example, the maximum value detecting device 12 that detects the absolute value of the maximum value of the load current) that detects the absolute value of the maximum value of the load current, a counter setting value output device (for example, the counter setting value output device 13 in the embodiments) that outputs a counter setting value corresponding to the maximum value; and a counter calculating device (for example, the counter calculating device 14) that outputs the arrival determination signal after the passage of a time interval that depends on the counter setting value output by the counter setting value output device after the drive signal generating device outputs a predetermined switching timing signal.

Due to having this structure, the maximum value detecting device detects the absolute value of the maximum value of the load current detected by the load current sensors in the inverter circuit, the counter setting value output device outputs the counter setting value that depends on the absolute value of the maximum value of the load current, and after the drive signal generating device outputs a predetermined switching timing signal, the counter calculating device outputs an arrival determination signal after the passage of a time interval that depends on the counter setting value output by the counter setting value output device.

In addition, when the resonant current arrival determining device outputs an arrival determination signal, the drive signal generating device generates a main drive signal that turns OFF the plus side main switching element and the minus side main switching element that are to be made non-conductive next.

Therefore, the resonant current sensor for detecting resonant current, which is necessary in conventional technology, becomes unnecessary.

In addition, according to the conventional method, because the response speed of the current sensor is very slow, equivalent to several $\mu$ seconds, it is very difficult to use for measuring a resonant circuit that operates at several $\mu$ seconds, and the error with respect to actual current was extremely large.

However, according to the structure described above, because the resonant current arrival determining device outputs the arrival determination signal based on the load current that changes extremely slowly in comparison to the resonant operation in the resonant circuit, the problem of the response speed of the current sensor does not occur, and in addition, because the analogue to digital conversion (A/D conversion) of the sensor output is reduced and timing control of the resonant operation can be realized with digital processing, the integration becomes simple, and size and weight reductions can be attained. In addition, because of the reduction in the use of current sensors that make the introduction of noise into the output signals easy, the influence on control by noise can be made small.

The second aspect of the present invention is the resonant inverter apparatus according to the first aspect wherein the drive signal generating apparatus comprises a delay circuit (for example, the delay circuit 11 in the embodiments) that, after the passage of a predetermined time interval after the resonant current arrival determining device outputs an arrival determination signal, generates a delay timing signal that turns ON the plus side main switching element and the minus side main switching element that are to be made conductive next.

According to this structure, the delay circuit generates a delay timing signal that turns ON the plus side main switching element and the minus side main switching element to be made conductive after the passage of a predetermined amount of time after the arrival determination signal is output by the resonant current arrival determining device.

Therefore, along with the resonant current sensor that detects the resonant current and the power source voltage sensor that detects the power source voltage, the cross terminal voltage sensor that detects the cross terminal voltage between the plus side main switching element and the minus side main switching element in each main circuit for each phase and the zero voltage detecting device that detects whether or not the cross terminal voltage detected by the cross terminal voltage sensor is zero become unnecessary.

Therefore, in the inverter apparatus, cross-terminal voltage sensors and resonant current sensors for soft switching do not have to be newly provided, and it becomes possible to form the inverter apparatus using only a digital circuit that generates a signal that follows the timing of the resonant operation. Therefore, the inverter apparatus can be made small and light weight, and in addition, the cost of the inverter apparatus can be decreased.

The third aspect of the invention is the resonant inverter apparatus according to the first and second aspects, wherein the inverter circuit comprises a power source voltage sensor (for example, the power source voltage sensor VBs in the embodiments) that detects the power source voltage (for example, the power source voltage Vx in the embodiments) output by the power source, and the counter setting value output device calculates the counter setting value based on the maximum value detected by the maximum value detecting device and the power source voltage detected by the power source voltage sensor.

According to this structure, the counter setting value output device calculates a counter setting value that depends on the power source voltage, not just the maximum value detected by the maximum value detecting device. In other words, the counter setting value that has been set based on the absolute value of the maximum value of the load current is compensated depending on the power source voltage.

Therefore, the size of the initial resonant current that forces conduction in the auxiliary circuit during the resonant operation can be controlled so as to attain the optimal value that depends on the power source voltage. That is, in the case that the value of the inductor is fixed, the slope of the resonant current that flows into the inductor changes when the resonant current rises due to the power source voltage. Thus, by detecting the power source voltage along with the maximum value of the current of the load current, the conduction time that the inductor requires to attain the initial resonant current necessary for resonance can be set to the optimal value. Thereby, reliable zero voltage switching can be realized. Moreover, in the case that a battery is used as a power source for an EV, HEV, or the like, the power source voltage sensor is already installed for use in the remaining charge control of the battery, and thus the power voltage sensor does not have to be newly provided, and the influence on the apparatus cost is small.

A fourth aspect of the present invention is an inverter apparatus comprising an inverter circuit that provides a direct current output by a power source after being converted to a three phase alternating current, a resonant circuit that is connected to the output terminal of this inverter circuit, and a control circuit that controls this resonant circuit and the inverter circuit. The inverter circuit comprises a three phase main circuit in which three main circuits, one for each phase, are connected in parallel, wherein, in a main circuit, a plus side main switching element connected to the plus terminal of the power source and a minus side main switching elements connected to the minus terminal of the power source are connected serially, and diodes are connected in parallel to the plus side main switching element and the minus side main switching element; a resonance capacitors connected to the plus side main switching element and the minus side main switching element in each phase of each circuit are connected in parallel; and a load current sensor that detects the load current flowing between main connection points that connect the plus side main switching element and the minus side main switching element in each phase of each circuit, and the motor. The resonance circuit comprises a three phase auxiliary circuit in which three auxiliary switching elements, one for each phase, are connected in parallel, wherein, in an auxiliary switching element, an outflow side auxiliary switching element and an inflow side auxiliary switching element that cause the current to flow only in a single direction, are connected serially, and the auxiliary connection points at which the outflow auxiliary switching element and the inflow auxiliary switching element in each auxiliary circuit for each phase are connected to the main connection point; a resonance inductor connected in parallel to each auxiliary circuit for each phase, and a resonance current sensor (for example, the resonance current sensor Is4 in the embodiments) that detects the resonant current flowing to the inductor. The control circuit comprises a resonant current arrival determining device that determines whether or not the resonant current detected by the resonant current sensor is larger than the load current detected by the load current sensor, and in the case that it is larger, outputs an arrival determination signal; and a drive signal generating device that generates a main drive signal that turns OFF the plus side main switching element and the minus side main switching element that are to be made non-conductive next when the resonant current arrival determining device outputs an arrival determination signal, generates an auxiliary drive signal that turns ON the outflow side auxiliary switching element and the inflow side auxiliary switching elements of the resonant circuit at a predetermined switching timing, and generates an auxiliary drive signal that turns OFF the conductive outflow side auxiliary switching element and the inflow side auxiliary switching element in the resonant circuit after the passage of a predetermined ON continuation time from the predetermined switching timing. The drive signal generating device comprises a delay circuit that generates a delay timing signal that turns ON the plus side main switching element and the minus side main switching element that are to be made conductive next after the passage of a predetermined time interval after the resonant current arrival determining device outputs an arrival determination signal.

Due to this structure, the delay circuit generates a delay timing signal that turns ON the plus side main switching element and the minus side main switching element that are to be made conductive next after the passage of a predetermined time interval from the point in time that the arrival determination signal is output by the resonant current arrival determining device.

Therefore, the cross terminal voltage sensor for detecting the cross terminal voltage of the plus side main switching element and the minus side main switching element in each main circuit for each phase and the zero voltage detecting device that detects whether or not the cross terminal voltage detected by the cross terminal voltage sensor is zero become unnecessary. Therefore, the cost of the resonant inverter apparatus decreases.

A fifth aspect of the invention is an inverter apparatus comprising inverter circuit that supplies a direct current that is output by a power source after being converted to a three phase alternating current, a resonant circuit connected to the output terminals of this inverter circuit, and a control circuit that controls this resonant circuit and the inverter circuit. The inverter circuit comprises a three phase main circuit in which three main circuits, one for each phase, are connected in parallel, wherein, in a main circuit, a plus side main switching element that is connected to the plus terminal of the power source and the minus main switching elements that is connected to the minus terminal of the power source are connected in series, and the plus side switching element and the minus side switching element are connected in parallel to diodes; resonance capacitors that are connected in parallel to the plus side main switching element and the minus side main switching element in each main circuit for each phase; load current sensors that detect a load current flowing between main connection points, at which the plus side main switching element and the minus side main switching element in each circuit for each phase are connected together, and the motor; a cross terminal voltage sensors (for example, the cross terminal voltage sensors Vs1, Vs3, and Vs5 in the embodiments) that detect the cross terminal voltages (for example, the cross terminal voltages V1, V3, and V5 in the embodiments) of the plus side main switching element and the minus side main switching element in each main circuit for each phase; and a power source voltage sensor that detects the power source voltage output by the power source. The resonant circuit comprises a three-phase auxiliary circuit in which three auxiliary circuits, one for each phase, are connected serially, wherein, in each auxiliary circuit, the outflow auxiliary switching elements and the inflow auxiliary switching elements that allow a current to pass only in one direction are connected in parallel, and the auxiliary connection points that connect the inflow auxiliary switching element and the outflow auxiliary switching element in each auxiliary circuit for each phase are connected to the main connection points; and a resonant inductor that is connected in parallel to the auxiliary circuits for each phase. The control circuit comprises a voltage difference calculating device (for example, the voltage difference calculating device 10 in the embodiments) that calculates the difference voltage, which is the difference between the power source voltage and the cross terminal voltage detected by each of the cross terminal voltage sensors; a zero voltage detecting device (for example, the zero voltage detecting device 8 in the embodiments) that detects whether or not the difference voltage and the cross terminal voltage are zero, and in the case that they are zero, outputs a zero voltage detection signal (for example, the zero voltage detection signals z1 to z6); and a drive signal generating device that generates a main drive signal that turns ON the plus side main switching element and the minus side main switching element that are to be made conductive next when the zero voltage detecting device outputs the zero voltage detection signal, generates an auxiliary drive signal that turns ON the outflow side auxiliary switching element and the inflow side auxiliary switching element at a predetermined switching timing, and generates an auxiliary drive signal that turns OFF the conductive outflow side auxiliary switching element and the inflow side auxiliary switching element after the passage of a predetermined ON continuation time from the predetermined switching timing.

Due to having this structure, the cross terminal voltage sensor for each phase detects the cross terminal voltage of the plus side main switching element and the minus side main switching element in each main circuit for each phase, the power source voltage sensor detects the power source voltage output by the power source, and the voltage difference calculating device calculates the difference voltage, which is the difference between the power source voltage detected by the power source voltage sensor in the inverter circuit and the cross terminal voltage detected by the cross terminal voltage sensors in each phase.

Therefore, in comparison to the conventional technology, it is possible to reduce the number of voltage sensors by two.

A sixth aspect of the invention is a resonant inverter apparatus according to claim 1 wherein the inverter circuit comprises a cross terminal sensor that detects the cross terminal voltage of the plus side main switching element and the minus side main switching element in each main circuit for each phase and a power source voltage sensor that detects the power source voltage output by the power source. The control circuit comprises a voltage difference calculating device that calculates the difference voltage, which is the difference between the power source voltage and the cross terminal voltage detected by each of the cross terminal voltage sensors and a zero voltage detecting device that detects whether or not the difference voltage and the cross terminal voltage are zero, and in the case that they are zero outputs a zero voltage detection signal. A drive signal generating device that generates a main drive signal that turns OFF the plus side main switching element and the minus main side main switching element that are to be made non-conductive next when the resonant voltage arrival determining device outputs an arrival determination signal, generates a main drive signal that turns on the plus side main switching element and the minus side main switching element that are to be made conductive next, generates an auxiliary drive signal that turns ON the outflow side auxiliary switching element and the inflow side auxiliary switching element at a predetermined timing, and generates an auxiliary drive signal that turns OFF the outflow side auxiliary switching element and the inflow side auxiliary switching element that are to be made non-conductive next after the passage of a predetermined ON continuation time from the predetermined switching timing.

According to this structure, the cross terminal voltage sensor for each phase detects the cross terminal voltage of the plus side main switching element and the minus side main switching element in the main circuit for each phase, the power source voltage sensor detects the power source voltage output by the power source, and the voltage difference calculating device calculates the difference voltage, which is the difference between the power source voltage detected by the power source sensor in the inverter circuit and the cross terminal voltage detected by the cross terminal voltage sensor for each phase.

Therefore, in comparison to conventional technology, the number of voltage sensors can be decreased by two.

In addition, like the first aspect, the drive signal generating device generates a main drive signal that turns OFF the plus side main switching element and the minus side main switching element that are to be made non-conductive next when the resonant voltage arrival determining device outputs an arrival determination signal.

Therefore, the resonant current sensors for detecting the resonant current, which have been necessary in the conventional technology, become unnecessary.

A seventh aspect of the invention is a resonant inverter apparatus of the sixth aspect wherein the counter setting value is calculated based on the maximum value detected by the maximum value detecting device and the power source voltage detected by the power source voltage sensor.

According to this structure, in the structure of the sixth aspect, the counter setting output device calculates a counter setting value that depends on the power source voltage not just the maximum value detected by the maximum value detecting device. In other words, the counter setting value that is set based on the absolute value of the maximum value of the load current is compensated depending on the power source voltage.

Therefore, the size of the initial resonant current is conducted into the auxiliary circuit during resonant operation can be set at the optimal value that depends on the power source voltage. That is, in the case that the value of the inductor is fixed, the slope of the resonant current flowing into the inductor rises due to the power source voltage. Thus, by detecting the maximum value of the current of the load current along with the power source voltage, the conducting time required by the inductor to attain the initial resonant current necessary for resonance can be set to an optimal value. Thereby, reliable zero voltage switching can be realized.

BRIEF EXPLANATION OF THE FIGURES

FIG. 3 is a timing chart showing the operation of the inverter apparatus according to a first embodiment of the present invention.

FIGS. 4A to 4J are drawings showing operations of each mode of the inverter apparatus according to a first embodiment of the present invention.

DETAILED DESCRIPTION OF THE INVENTION

Figure 1:
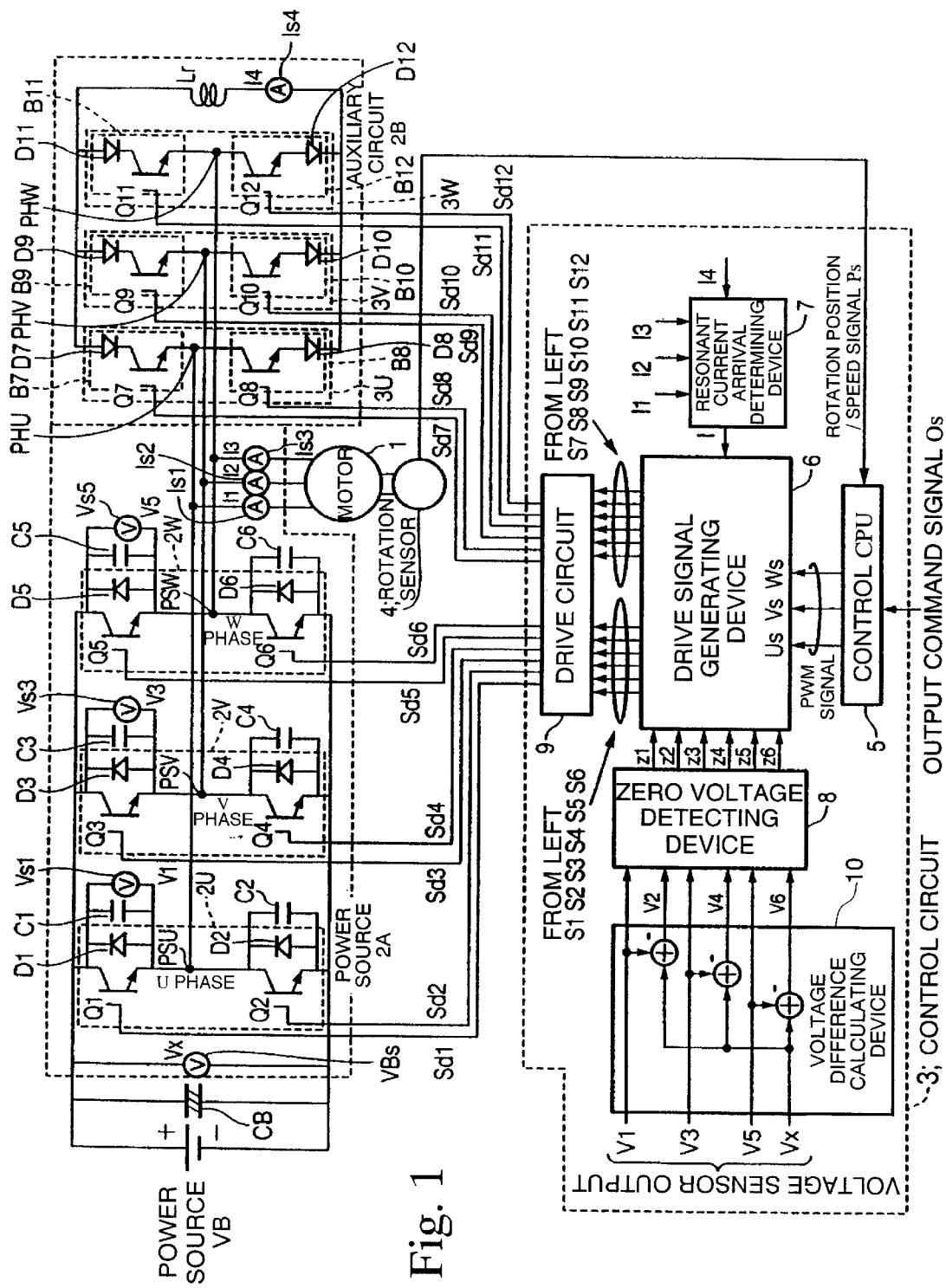
FIG. 1 is a circuit diagram showing the structure of an inverter apparatus according to a first embodiment of the present invention.

FIG. 1 is a circuit diagram that shows the structure of the resonant inverter apparatus according to a first embodiment of the present invention. The resonant inverter apparatus according to the present embodiment comprises a main circuit 2A that supplies a direct current output from a direct current power source VB to a motor 1 after being converted to a three phase alternating current, an auxiliary circuit 2B that is connected to the output terminal of the main circuit 2A, and a control circuit that controls the auxiliary circuit 2B and the main circuit 2A. A smoothing capacitor CB is connected between the plus terminal and the minus terminal of the direct current source VB.

The main circuit 2A comprises a three phase main circuit, six resonant capacitors C1 to C6, three phase load current sensors Is1 to Is3, three cross terminal voltage sensors Vs1, Vs3, and Vs5, and the power source voltage sensor VBs.

The three phase main circuit is structured by three main circuits 2U, 2V, and 2W, one for each phase, that are connected in parallel.

The main circuit for the phase 2U is formed by a plus side main switching element Q1 that is connected to the plus terminal of the power source VB, a minus side main switching element Q2 that is connected to the minus terminal of the power source VB, a diode D1 that is connected in parallel to the plus side main switching element Q1, and a diode D2 that is connected in parallel to the minus side main switching element Q2. Specifically, the plus side main switching element Q1 and the minus side main switching element Q2 are insulated gate bipolar transistors (IGBTs). That is, the collector of the plus side main switching element Q1 is connected to the plus terminal of the direct current power source VB, and the emitter of the minus side main switching element Q2 is connected to the minus terminal of the direct current power source VB. The plus side main switching element Q1 and the minus side switching element Q2 are connected serially to the main connection point PSU. That is, the emitter of the plus side main switching element Q1 and the collector of the minus side main switching element Q2 are connected to the main connection point PSU. In addition, the anode of the diode D1 is connected to the emitter side of the plus side of the main switching element Q1, and the cathode of the diode D1 is connected to the collector of the plus side main switching element Q1.

The main circuit for the phase 2V comprises a plus side main switching element Q3 that is connected to the plus terminal of the direct current power source VB, a minus side main switching element Q4 that is connected to the minus terminal of the direct current power source VB, a diode D3 that is connected in parallel to the minus side main switching element Q3, and a diode D4 that is connected in parallel to the minus side main switching element Q4. Specifically, the plus side main switching element Q3 and the minus side main switching element Q4 are insulated gate bipolar transistors (IGBTs). Moreover, the connection relationships between the plus side main switching element Q3, the minus side main switching element Q4, and the diodes D3 and D4 in the main circuit for the phase 2V are identical to those described above, and thus their explanation is omitted.

The main circuit for the phase 2W comprises a plus side main switching element Q5 that is connected to the plus terminal of the direct current power source VB, a minus side main switching element Q6 that is connected to the minus terminal of the direct current power source VB, a diode D5 that is connected in parallel to the plus side main switching element Q5, and a diode D6 that is connected in parallel to the minus side main switching element Q6. Specifically, the plus side main switching element Q5 and the minus side main switching element Q6 are insulated gate bipolar transistors (IGBTs). Moreover, the connection relationships between the plus side main switching element Q5, the minus side main switching element Q6, and the diodes D5 and D6 in the main circuit for the phase 2W are identical to those described above, and thus their explanations are omitted.

The six capacitors C1 to C6 are connected in parallel to the plus side main switching element and the minus side switching element in each main circuit for the phases 2U, 2V, and 2W.

Specifically, the capacitor C1 is connected in parallel to the plus side main switching element Q1 in the main circuit for the phase 2U, and the capacitor C2 is connected in parallel to the minus side main switching element Q2 in the main circuit for the phase 2U. Concretely, the capacitor C1 is connected across the collector and emitter of the plus side main switching element Q1. In addition, the capacitor C2 is connected across the collector and emitter of the minus side main switching element Q2.

Moreover, the connection relations between the plus side main switching element Q3, the minus side main switching element Q4, and the capacitors C3 and C4 in the main circuit for the phase 2V are identical to those described above, and thus their explanations are omitted. In addition, the connection relations between the plus side main switching element Q5, the minus side main switching element Q6, and the capacitors C5 and C6 in the main circuit for the phase 2W are identical to those described above, and thus their explanations are omitted.

The load current sensors for each phase Is1 to Is3 detect the load currents I1, I2, and I3 that flow between the main connection points PSU, PSV, and PSW that connect the plus side main switching elements Q1, Q3, and Q5 and the minus side switching elements Q2, Q4, and Q6 in the main circuits for the phases 2U, 2V, and 2W and the motor, and outputs a load current signal. That is, the load current sensors Is1 to Is3 connect between the main connection pints PSU, PSV, and PSW that connect the plus side main switching element Q1, Q3, and Q5 and the minus side main switching element Q2, Q4, and Q6 in the main circuits for the phases 2U, 2V, and 2W, and the motor.

The three cross terminal voltage sensors Vs1, Vs3, and Vs5 detect the cross terminal voltage of the plus side main switching elements Q1, Q3, and Q5 in the main circuits for the phases 2U, 2V, and 2W. That is, the cross terminal voltage sensors Vs1, Vs3, and Vs5 are connected across the collector and emitter of the plus side main switching elements Q1, Q3, and Q5 in the main circuits for the phases 2U, 2V, and 2Q.

The power source voltage sensor VBs detects the power source voltage Vx output by the direct current power source VB. That is, the power source voltage sensor VBs is connected across the plus terminal and the minus terminal of the direct current power source VB.

The auxiliary circuit 2B comprises a three phase auxiliary circuit, a resonant inductor Lr, and a resonant current sensor Is4.

The three phase auxiliary circuit is formed by three auxiliary circuits 3U, 3V, and 3W, one for each phase, connected in parallel.

The auxiliary circuit for the phase 3U is formed by the outflow side auxiliary switching element block B7 that forces a current to flow from the auxiliary circuit 3 and an inflow side auxiliary switching element block B8 that forces a current to flow into the auxiliary circuit 3. The outflow side auxiliary switching element block B7 and the inflow side auxiliary switching element block B8 are connected serially at the auxiliary connection point PHU.

The outflow side auxiliary switching element block B7 is formed by the outflow side auxiliary switching element Q7 and the diode D7. The diode D7 and the outflow side auxiliary switching element Q7 are connected serially. Specifically, the outflow side auxiliary switching element Q7 is an insulated gate bipolar transistor (IGBT). That is, the cathode of the diode D7 and the collector of the outflow side auxiliary switching element Q7 are connected. Therefore, this outflow side auxiliary switching element block B7 forces the current to flow unidirectionally.

The inflow side auxiliary switching element block B8 is formed by the inflow side auxiliary switching element Q8 and the diode D8. The inflow side auxiliary switching element Q8 and the diode D8 are connected serially. Specifically, the inflow side auxiliary switching element Q8 is an insulated gate bipolar transistor (IGBT). That is, the emitter of the inflow side auxiliary switching element Q8 and the anode of the diode D8 are connected. Therefore, this inflow side auxiliary switching element block B8 forces the conduction of current in one direction.

In addition, the emitter of the outflow side auxiliary switching element Q7 in the outflow side auxiliary switching element block B7 is connected to the collector of the inflow side auxiliary switching element Q8 in the inflow side auxiliary switching element block B8 at the auxiliary connecting point PHU. This auxiliary connection point PHU is connected to the main connecting point PSU in the main circuit for the phase 2U in the main circuit 2A.

The auxiliary circuit for the phase 3V is formed by the outflow side auxiliary switching element block B9 and the inflow side auxiliary switching element block B10. Moreover, the connection relations between outflow side auxiliary switching element block B9 and the inflow side auxiliary switching element block B10, and the internal structure thereof are identical to those described above, and thus they are eliminated.

The auxiliary circuit for the phase 3W is formed by the outflow side auxiliary switching element block B11 and the inflow side auxiliary switching element block B12. Moreover, the connection relations between outflow side auxiliary switching element block B11 and the inflow side auxiliary switching element block B12, and the internal structure thereof are identical to those described above, and thus they are eliminated.

The resonant inductor Lr is connected serially to the auxiliary circuits 3U, 3V, and 3W for each phase. Specifically, the resonant inductor Lr is connected between the upper terminals of the inflow side auxiliary switching element blocks B7, B9, and B11 and the lower terminals of the inflow side auxiliary switching element blocks B8, B10, and B12 in the auxiliary circuits 3U, 3V, and 3W for each phase. That is, the inductor Lr is connected between the anode of the diodes D7, D9, and D11 in the outflow side auxiliary switching element blocks B7, B9, and B11 and the cathodes of the diodes D8, D10, and D12 in the inflow side auxiliary switching element blocks B8, B10, and B12.

The resonant current sensor Is4 detects the resonant current flowing into the inductor Lr. Thus, the resonant current sensor Is4 is connected serially to the inductor Lr.

The control circuit 3 comprises the voltage difference calculating device 10, the zero voltage detecting device 8, the resonant current arrival determining device 7, the control CPU 5, the drive signal generating device 6, and the drive circuit 9.

The voltage difference calculating device 10 calculates the difference voltages Vx−V1, Vx−V3, and Vx−V5, which are the differences between the power source voltage Vx detected by the power source voltage sensor VBs and the cross terminal voltages V1, V3, and V5 detected by each of the cross terminal voltage sensors Vs1, Vs3, and Vs5, and calculates the cross terminal voltages V2, V4, and V6 of the minus side switching elements Q2, Q4, and Q6.

The zero voltage detecting device 8 detects whether or not the cross terminal voltages V1, V3, and V5 detected by each of the cross terminal voltage sensors Vs1, Vs3, and Vs5 in the main circuit 2A and the cross terminal voltages V2, V4, and V6 detected by the voltage difference calculating device 5 are zero, and in the case that they are zero, the zero voltage detection signals z1 to z6 corresponding to each of the cross terminal voltages V1 to V6 are output.

The resonant current arrival determining device 7 determines whether or not the resonant current I4 detected by the resonant current sensor Is4 in the auxiliary circuit 2B is larger than the load currents I1, I2, and I3 detected by the load current sensors Is1, Is2, and Is3 in the main circuit 2A, and in the case that it is larger, outputs the arrival determination signal I.

The control CPU 5 outputs the PWM signals Us, Vs, and Ws based on the output command signal Os and the rotation position and speed signal Ps output by the rotation sensor 4 that detects the rotation position and the speed of the motor 1.

The drive signal generating device 6 outputs the main drive signals S1 to S6 and the auxiliary drive signals S7 to S12 based on the PWM signals Us, Vs, Ws output by the control CPU 5. The main drive auxiliary signals S1 to S6 and the auxiliary drive signals S7 to S12 are converted to main drive signals Sd1 to Sd6 and auxiliary drive signals Sd7 to Sd12 by the drive circuit 9.

The main drive signals Sd1, Sd2, Sd3, Sd4, Sd5, and Sd6 are respectively input into the gates of the plus side main switching element Q1, the minus side main switching element Q2, the plus side main switching element Q3, the minus side main switching element Q4, the plus side main switching element Q5, and the minus side main switching element Q6 in the main circuit 2A, and these main switching elements are switched (turned ON or turned OFF).

The auxiliary drive signals Sd7, Sd8, Sd9, Sd10, Sd11, and Sd12 are respectively input into the gates of the outflow side auxiliary switching element Q7, the inflow side auxiliary switching element Q8, the outflow side auxiliary switching element Q9, the inflow side auxiliary switching element Q10, the outflow side auxiliary switching element Q11, and the inflow side auxiliary switching element 12 in the auxiliary circuit 2B, and these auxiliary switching elements are switched (turned ON or turned OFF).

In addition, in the main circuit 2A, the drive signal generating device 6 generates the main drive signals S1 to S6 that turn OFF the corresponding plus side main switching elements Q1, Q3, and Q5 and the minus side main switching elements Q2, Q4, and Q6 that function as plus side main switching elements and minus side main switching elements to be made non-conducing next when the resonant current arrival determining device 7 outputs an arrival determination signal I.

In addition, in the main circuit 2A, the drive signal generating device 6 generates the main drive signals S1 to S6 that turn ON the corresponding plus side switching elements Q1, Q3, and Q5 and the minus side main switching elements Q2, Q4, and Q6 that function as plus side main switching elements and minus side switching elements that are to be made conductive next when the zero voltage detecting device 8 outputs the zero voltage detection signals z1 to z6 that respectively correspond to each of the cross terminal voltages V1 to V6.

In addition, in the auxiliary circuit 2A, in synchronism with a predetermined switching timing of the PWM signal directed by the control CPU 5, the drive signal generating device 6 generates the auxiliary drive signals S7 to S12 that turn ON the corresponding outflow side auxiliary switching elements Q7, Q9, and Q11 and the inflow side auxiliary switching elements Q8, Q10, and Q12 that function as outflow side auxiliary switching elements and inflow side auxiliary switching elements that are to be made conductive next.

In addition, the drive signal generating device 9 generates the auxiliary drive signals S7 to S12 that turn OFF the corresponding conducting outflow side auxiliary switching elements Q7, Q9, and Q11 and inflow side auxiliary switching elements Q8, Q10, and Q12 as outflow side auxiliary switching elements and inflow side auxiliary switching elements after the passage of a predetermined ON continuation time set by the memory unit and calculating unit (not illustrated) based on the predetermined switching timing of the PWM signal commanded by the control CPU 5.

According to this structure, in comparison to conventional technology, the number of voltage sensors is decreased by two.

Figure 2:
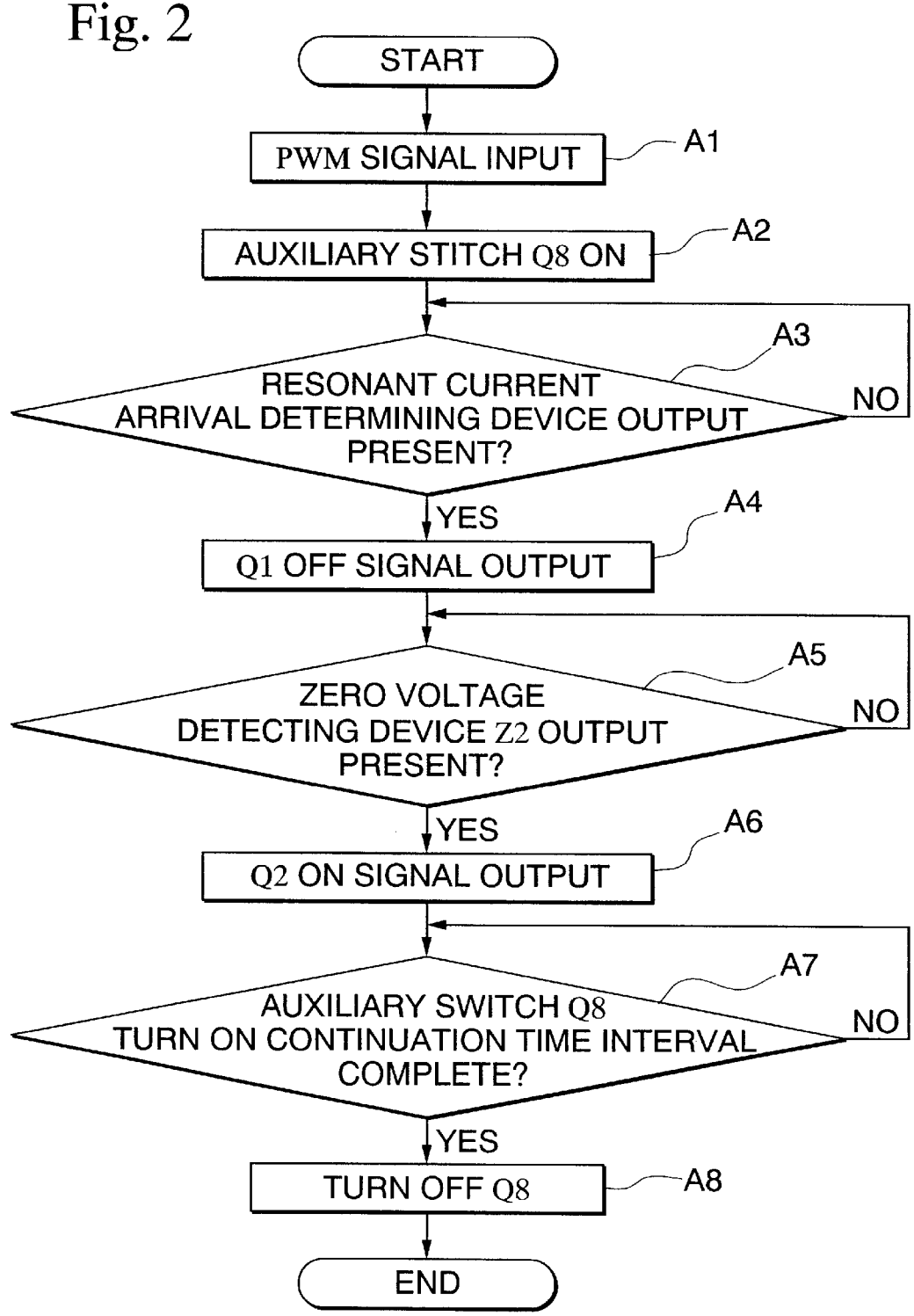
FIG. 2 is a flowchart showing the operation of the inverter apparatus according to a first embodiment of the present invention.

FIG. 2 is a flowchart showing the operation of the inverter apparatus in the present embodiment.

In the collective resonant snubber inverter, it is necessary to carry out two or three phase simultaneous switching. In the case of carrying out two phase simultaneous switching, control must be carried out so that the operation of the main switching element is switched such that in one phase the plus side main switching element is turned OFF from the ON state (conducting state) and the minus side main switching element is turned ON from the OFF state (non-conducting state). In the other phase, the minus side main switching element is turned OFF from the ON state and the plus side main switching element is turned ON from the OFF state. In the case of carrying out three phase simultaneous switching, control must be carried out so that, for example, the operation of the main switching element is switched such that when, in the first phase, the plus side main switching element is in an ON state and the minus side main switching element is in an OFF state, in one among the other two phases (the second phase) the minus side main switching element must be turned OFF from the ON state and the plus side main switching element must be turned OFF from the ON state. The third phase operates in the same manner as the second phase. In the flowchart, only the operation of the one phase is shown among the operations in the case of carrying out two phase simultaneous switching. In the operation of the other phase, the plus side main switching element is simply substituted for the minus side main switching element, and thus the explanation is omitted.

Specifically, as a representative example, the flowchart shows the transitions in the main circuit 2A in which the U phase of Q1 transits from the ON state to the OFF state, Q2 transits from the OFF state to the ON state, the W phase of Q6 transits from the ON state to the OFF state, and Q5 transits from the OFF state to the ON state.

Below, the operation will be explained according to the flowchart. Moreover, in the following explanation the reference symbols such as A1 or the like represent the steps in the flowchart.

The control CPU 5 sends PWM signals Us, Vs, and Ws to the drive signal generating device 6 (A1), and then sends to the drive signal generating device 6 a command that, in the U phase, changes the plus side main switching element Q1 from ON to OFF and changes the minus side main switching element Q2 from OFF to ON, and, in the W phase, changes the plus side main switching element Q5 from OFF to ON and changes the minus side main switching element Q6 from ON to OFF.

Thereby, in the U phase the inflow side auxiliary switching element Q8 of the auxiliary circuit 2B is turned ON (A2). Moreover, in the W phase the outflow side auxiliary switching element Q11 of the auxiliary circuit 2B is simultaneously turned ON.

Next, the resonant current arrival determining device 7 detects whether or not an arrival determination signal I has been output (A3). Moreover, the resonant current arrival determining device 7 outputs an arrival determination signal I when the resonant current I4 is larger than a maximum value of the absolute value among the load currents I1, I2, and I3. If the arrival determination signal I has not been output (No), this step is repeated.

If the arrival determination signal I has been output (Yes), the drive signal generating device 6 sends a drive signal Sd1 to the plus side main switching element Q1 in the U phase the main circuit 2A via the drive circuit 9, and turns OFF the conducting plus side main switching element Q1 (A4). Moreover, simultaneously, the drive signal generating device 6 sends a main drive signal Sd6 to the minus side main switching element Q6 in the W phase the main circuit 2A, and turns OFF the conducting minus side main switching element Q6.

Next, the drive signal generating device 6 detects whether or not a zero voltage detection signal z2 has bee output from the zero voltage detecting device 8, that is, detects whether the cross terminal voltage V2 is zero (A5). If it has not fallen to zero (No), this step is repeated.

If it has fallen to zero (Yes), the minus side main switching element Q2 in the U phase of the main circuit 2A that is to be made conductive next is turned ON (A6). When the cross terminal voltage V5 falls to zero, the plus side main switching element Q5 in the W phase of the main circuit 2A that is to be turned ON next is turned ON.

Next, the drive signal generating device 6 detects whether or not the ON continuation time of the inflow side auxiliary switching element Q8 in the U phase of the auxiliary circuit 2B has completed (A7). If the ON continuation time has not completed (No), this step is repeated.

If the ON continuation time has completed (Yes), the conducting inflow side auxiliary switching element Q8 in the U phase of the auxiliary circuit 2B is turned OFF (A8). Moreover, the outflow side auxiliary switching element Q8 in the W phase of the auxiliary circuit 2B is simultaneously turned OFF.

FIG. 3 is a timing chart showing the operation of the inverter device according to the present embodiment.

The operation of the inverter apparatus will be explained with reference to this figure. However, in explaining the operation of the inverter apparatus, the voltage and current in each circuit diagram of FIG. 1, and the ON/OFF notation for each switching element will be defined in advance. First, the voltage and current of each part are defined as follows:

(1) V1 is defined as the voltage applied to both terminals of the parallel circuit of the plus side main switching element Q1, the diode D1, and the capacitor C1, where the collector of Q1 serves as the normal direction, and similarly, (2) V2 is defined as the voltage applied to both terminals of the parallel circuits Q2, D2, and C2, where the collector of Q2 serves as the normal direction, (3) V3 is defined as the voltage applied to both terminals of the parallel circuits Q3, D3, and C3, where the collector of Q3 serves as the normal direction, (4) V4 is defined as the voltage applied to both terminals of the parallel circuits Q4, D4, and C4, where the collector of Q4 serves as the normal direction, (5) V5 is defined as the voltage applied to both terminals of the parallel circuits Q5, D5, and C5, where the collector of Q5 serves as the normal direction, (6) V6 is defined as the voltage applied to both terminals of the parallel circuits Q6, D6, and C6, where the collector of Q6 serves as the normal direction.

Furthermore, the direction in which the three phase currents I1, I2, and I3 that flow into the motor (load) 1 flow into the motor (load) 1 is defined as the normal direction.

In addition, the definitions of the ON/OFF of the plus side main switching elements Q1, Q3, and Q5 and the minus side main switching elements Q2, Q4, and Q6 are as follows. In the U phase of the main switching circuit 2A, the state in which the plus side main switching element is ON and the minus side main switching element Q2 is OFF is represented as "1"; the state in which the plus side main switching element Q1 of the U phase is OFF and the minus side main switching element Q2 is ON is represented as "0". In the V phase, the state in which the plus side main switching element Q3 is ON and the minus main switching element Q4 is OFF is represented as "1", and the state in which the plus side main switching element Q3 is OFF and the minus side main switching element Q4 is ON is represented as "0". In the W phase, the state in which the plus side main switching element Q5 is ON and the minus side main switching element Q6 is OFF as well is represented as "1", and the state in which the plus side main switching element Q5 is OFF and the minus side main switching element Q6 is ON is represented as "0". Therefore, for example, when the PWM control signal (Us, Vs, Ws) output by the control CPU 5 is denoted by (1, 0, 0), this indicates the state in which the plus side main switching element Q1 is ON, the minus side main switching element Q2 is OFF, the plus side main switching element Q3 is OFF, the minus side main switching element Q4 is ON, the plus side main switching element Q5 is OFF, and the minus side main switching element Q6 is ON.

In addition, the drive signal output by the drive signal generating device 6 to the switching element indicates a conduction interruption by the logical value "0" and conduction by "1".

Furthermore, the operation shown in FIG. 3 will be explained for the case in which the PWM signal (Us, Vs, Ws) is switched from (1, 0, 0) to (0, 0, 1), and then to (1, 1, 0) as one example for explaining the control mode of the inverter apparatus. Moreover, in cases other than this one, the operation is the same.

The operation of the inverter apparatus will be explained using FIG. 3 and FIGS. 4A to 4J based on the definitions of the voltage and current for each part defined above, and the definitions of the ON/OFF for each switching element.

First, at time t1, since the stationary state of (U, V, W)=(1, 0, 0), as shown in mode 1 of FIG. 4A, the current flowing towards the U phase terminal of the motor 1 via the plus side main switching element Q1 from the direct current power source VB returns to the direct current power source VB by flowing through each of the minus side main switching elements Q4 and Q6 respectively from the V phase element and the W phase element of the motor 1. In addition, in the stationary state of the mode 1, the outflow side auxiliary switching elements Q7, Q9, and the inflow side auxiliary switching element Q12 of the auxiliary circuit 2B are in the ON state and the inflow auxiliary switching elements Q8, Q10, and outflow side auxiliary switching element Q11 are in the OFF state, but because there is no accumulation of energy in the resonant inductor Lr, the current does not flow to the resonant inductor Lr.

When the control CPU 5 changes the PWM control signal from the stationary state in which (Us, Vs, Ws) is equal to (1, 0, 0), to the state in which the (Us, Vs, Ws) is equal to (0, 0, 1), as shown in mode 2 of FIG. 4B, the drive signal generating device 6 turns ON the inflow side auxiliary switching element Q8 and the outflow side auxiliary switching element Q11 by switching the logical value of the switching control signals S 8 and S 11 for the inflow side auxiliary switching elements Q8 and outflow side auxiliary switching element Q11 of the auxiliary switching circuit 2B from "0" to "1". At this time, a portion of the current flowing from the plus side main switching element Q1 to the U phase terminal of the motor 1 flows through the resonant inductor Lr and returns to the direct current power source VB via the minus side main switching elements Q4 and Q6, and the energy, which is the current ILr serving as the initial current, is accumulated in the resonant inductor Lr.

The inflow side auxiliary switching element Q8 and the outflow side auxiliary switching element Q11 are turned ON, the induced current I4 flows out, and at time t2, when the induced current I4 becomes larger than the absolute value of the maximum value (I1 in the example in FIG. 3) of the load current, the resonant current arrival determining device 7 outputs the logical value "1" as the arrival determination signal I, and receiving this, as shown in mode 3 FIG. 4C, the drive signal generating device 6 switches the logical value of the switching control signals S1 and S5 for the plus side main switching element Q1 and the minus side main switching element Q6 of the main switching circuit 2A from "1" to "0", and thereby the plus side main switching element Q1 and the minus side main switching element Q6 are turned OFF.

At this time, at the plus side main switching elements Q1 and the minus side main switching element Q6, the voltages V1 and V6 of the collector terminals and the emitter terminals of the plus side main switching element Q1 and the minus side main switching element Q6 cannot surge rapidly due to the time constants for each of the capacitors C1 to C6, and thus a ZVS (zero voltage switching) in the plus side main switching element Q1 and minus side main switching element Q6 can be realized.

In addition, when the plus side main switching element Q1 and the minus side main switching element Q6 are turned OFF, along with the charging of the capacitors C1 and C6, the voltages V2 and V5 at both terminals of the capacitors C2 and C5 that have had a voltage approximately the same as the power source voltage Vx applied until this point in time fall because the discharge of the capacitors C2 and C5 has begun because they are connected to the snubber capacitors C1 and C6. The charging current of these capacitors C1 and C6 and the discharge current of C2 and C5 establish a resonant mode in which they circulate in the circuit by flowing through the resonant inductor Lr as resonant current.

Furthermore, when this resonant current mode continues, more resonant current flows due to the energy accumulated in the resonant inductor Lr, and at the point in time that both terminal voltages V2 and V5 of the capacitors C2 and C5 have become substantially "zero", the energy accumulated in the resonant inductor Lr flows via the diodes D2 and D5.

Next, at time t3, the cross terminal voltage sensors Vs2 and Vs5 that measure the voltage across the collector terminal and emitter terminal of the plus side main switching element Q2 and minus side main switching element Q5 of the main switching circuit 2A detect that the voltage across the collector terminal and emitter terminal of the plus side main switching element Q2 and the minus side main switching element Q5 has become "zero", the logical values of the outputs z2 and z5 of the zero voltage detecting device 8 switch from "0" to "1". After receiving this, the drive signal generating device 6 switches the logical value of the switching control signals S2 and S5 of the plus side main switching element Q2 and the minus side main switching element Q5 of the main switching circuit 2A from "0" to "1", the plus side main switching element Q2 and the minus side main switching element Q5 are switched ON, and transits to the regeneration mode 4 in FIG. 4D of the (Us, Vs, Ws) that is equal to (0, 0, 1), which is the output voltage vector V4. At this time, at the plus side main switching element Q2 and minus side main switching element Q5, the voltages V2 and V5 across the collector terminal and the emitter terminal of the plus side main switching element Q2 and minus side main switching element Q5 is "zero", and due to the state in which a voltage flows to each of the diodes D2 and D5, ZVS (zero voltage switching) and ZCS (zero current switching) in the plus side main switching element Q2 and the minus side main switching element Q5 can be realized.

Next, in the regeneration mode of mode 4, due to the regeneration energy of the motor 1 and the energy accumulated in the resonant inductor Lr, a regeneration current that flows from the W phase terminal of the motor 1 to the plus side of the direct current power source VB via the plus side main switching element Q5, a regeneration current that flows from the V phase terminal of the motor 1 to the minus side of the direct current power source VB via the minus side main switching element Q4, a regeneration current that flows to the U phase terminal of the motor 1 by flowing through the minus side main switching element Q2, and a current that flows to the inflow side auxiliary switching element Q8, the resonant inductor Lr, and the outflow side auxiliary switching element Q11 are generated.

However, because the power source voltage of the direct current power source VB is applied to the resonant inductor Lr as a reverse voltage in a direction that decreases the current ILr, the current ILr gradually decreases to zero. When the current ILr becomes zero, the current that tries to flow to the emitter side of the inflow side auxiliary switching elements Q8 and Q11 due to the power source voltage of the direct current power source VB is blocked by the diodes D8 and D11, and the mode transits to the stationary mode of the mode 5 shown in FIG. 4E.

Next, similarly to the operation described above, at time t4, when the control CPU 5 changes the PWM signal from the stationary state in which the (Us, Vs, Ws) is equal to (0, 0, 1), to the state in which the (Us, Vs, Ws) equal to (1, 1, 0), as shown in mode 6 in FIG. 4F, the drive signal generating device 6 changes logical value of the drive signals S7 and S9 of the outflow side auxiliary switching elements Q7 and Q9 and the inflow side auxiliary switching element Q12 of the auxiliary switching circuit 2B from "0" to "1", and the outflow auxiliary switching elements Q7 and Q9 and the inflow side auxiliary switching element Q12 are turned ON. When the outflow side auxiliary switching elements Q7 and Q9, and the inflow side auxiliary switching element Q12 are turned ON the inductance voltage I4 flows out, and at time t5, the induced current I4 becomes larger than the absolute value of the maximum value (I1 in the example in FIG. 6) of the load current, the mode becomes the mode 7 shown in FIG. 4G, and the logical value of the output I of the resonant current arrival determination device 7 is switched from "0" to "1". Having received this, the drive signal generating device 6 switches the logical value of the switching control signals S2 and S4 for the minus side main switching elements Q2 and Q4, and the plus side main switching element Q5 of the main switching circuit 2A from "1" to "0", the main minus side main switching elements Q2 and Q4 and the plus side main switching element Q5 are turned OFF, and the mode transits to mode 8 shown in FIG. 4H.

At this time, at the minus side main switching elements Q2 and Q4, and the plus side main switching element Q5, the voltages V2, V4, and V5 across the collector terminal and the emitter terminal of the minus side main switching elements Q2 and Q4, and the plus side main switching element Q5 cannot surge rapidly due to the respective time constants of the capacitors C2, C4, and C5, and thus ZVS in the minus side main switching elements Q2 and Q4, and the plus side main switching element Q5 is realized.

In addition, when the minus side main switching elements Q2 and Q4, and the plus side main switching element Q5 are turned OFF, along with the charge voltage of the snubber capacitors C2, C4, and C5, voltages of both terminals of the V1, V3, and V6 of the capacitors C1, C3, and C3 that have had a voltage applied that is approximately equal to the power source voltage Vx until this point in time fall because of the start of the discharge of the capacitors C1, C3, and C6 due to being connected to capacitors C2, C4, and C5. The charging current of these capacitors C2, C4 and C5 and the discharge current of capacitors C1, C3 and C6 establish a resonant mode, in which they circulate in the circuit by flowing through the resonant inductor Lr as resonant current.

Furthermore, when this resonant mode is continued, more resonant current flows due to the energy accumulated in the resonant inductor Lr, and at the point in time that the voltages V21, V3 and V6 at both terminals of the capacitors C1, C3 and C6 have become "zero", the energy accumulated in the resonant inductor Lr flows via the diodes D1, D3, and D6, as shown in Mode 9 of FIG. 4I.

Next, at time t6, the cross terminal voltage sensors Vs1, Vs3, and Vs6 which measure the voltage across the collector terminal and emitter terminal of the plus side main switching elements Q1 and Q3 and the minus side main switching element Q6 of the main switching circuit 2A, detect that the voltage across the collector terminal and emitter terminal of the plus side main switching elements Q1 and Q3, and the minus side main switching element Q6 has become "zero", the logical values of the outputs z1, z3, and z6 of the zero voltage detecting device 8 switches from "0" to "1". After receiving this, the drive signal generating device 6 switches the logical values of the drive signals S1, S3 and S6 of the plus side main switching elements Q1 and Q3, and the minus side main switching element Q6 of the main switching circuit 2A from "0" to "1", the plus side main switching elements Q1 and Q3, and the minus side main switching element Q6 are switched ON, and transits to the stationary mode of the (Us, Vs, Ws) equal to (1, 1, 0), shown in Mode 10 of FIG. 4J.

At this time, at the plus side main switching elements Q1 and Q3, and the minus side main switching element Q6, the voltages V1, V3, and V6 across the collector terminal and the emitter terminal of the plus side main switching elements Q1 and Q3, and the minus side main switching element Q6 is "zero", and due to the state in which the energy accumulated in the inductor Lr flows as current to each of the diodes D1, D3 and D5, current does not flow to the plus side main switching elements Q1 and Q3, and the minus side main switching element Q6, and thus ZVS and ZCS in the plus side main switching elements Q1 and Q3, and the minus side main switching element Q6 are realized.

Figure 5:
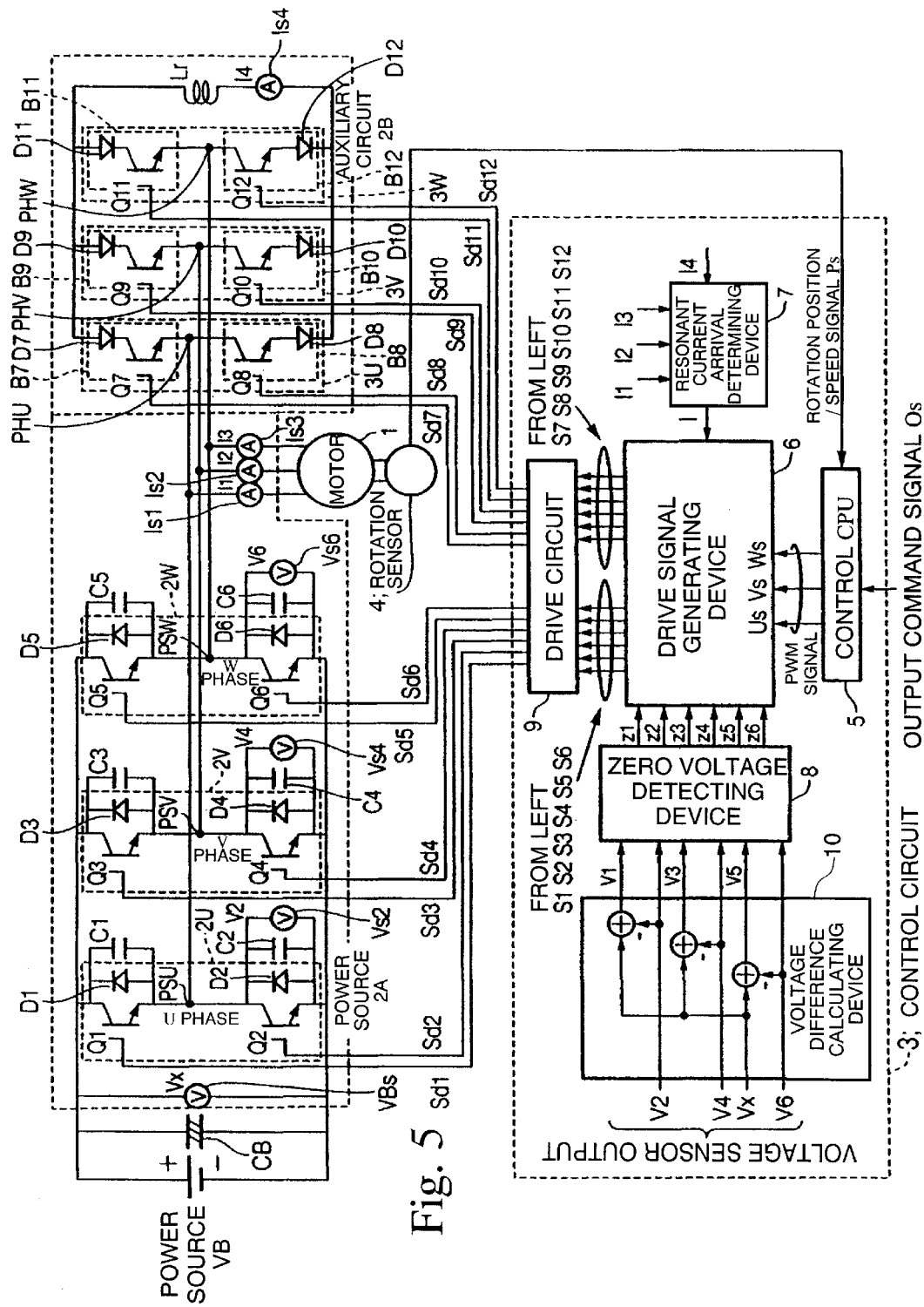
FIG. 5 is a circuit diagram showing the structure of the inverter control circuit according to a second embodiment of the present invention.

FIG. 5 is a circuit diagram showing the structure of the inverter control circuit according to a second embodiment of the present invention. The difference between the present embodiment and the first embodiment is that instead of cross terminal voltage sensors Vs1, Vs3, and Vs5, cross terminal voltage sensors Vs2, Vs4, and Vs6, which detect the cross terminal voltages V2, V4, and B6, are connected between the collectors and emitters of the minus side main switching elements Q2, Q4, and Q6 in the three U, V, and W phases. The structures other than this are identical to those in the first embodiment, and identical effects to those of the first embodiment are obtained.

Figure 6:
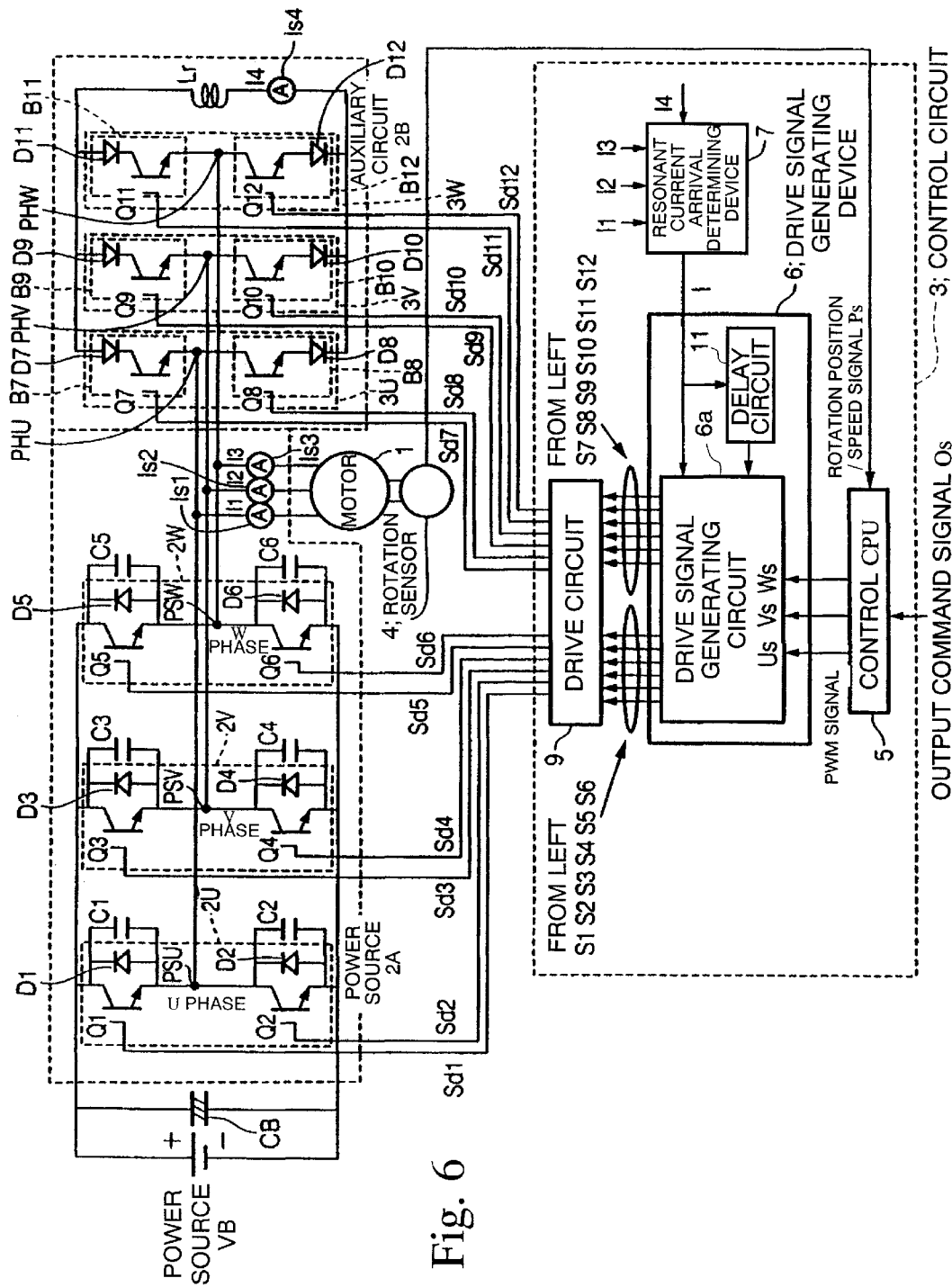
FIG. 6 is a circuit diagram showing the structure of the inverter control circuit according to a third embodiment of the present invention.

FIG. 6 is a circuit diagram of the structure of the inverter control circuit according to a third embodiment of the present invention. The difference between the present embodiment and the first embodiment is that the cross terminal voltage sensors Vs1, Vs3, and Vs5, the power source voltage sensor VBs, the voltage difference calculating device 10, and the zero voltage detecting device 8 have been eliminated, and instead, a delay circuit 11 has been provided in the drive signal generating device 6.

After the passage of a predetermined time interval after the resonant current arrival determining device 7 has output the arrival determination signal I, the delay circuit 11 generates a delay timing signal that turns ON the corresponding plus side main switching elements and minus side main switching elements that function as the plus side main switching elements and minus side main switching elements that are to be made conductive next in the main circuit 2A, and outputs the delay timing signal DL to the drive signal generating circuit 6a. In the drive signal generating circuit 6a, at the point in time that the ON signal of the delay timing signal DL has been received, the main drive signal is output to the plus side main switching elements and the minus side main switching elements that are to be made conductive next.

Thereby, the cross terminal voltage sensors that detect the cross terminal voltages (the voltage between the collectors and emitters) of the plus side main switching elements and the minus side main switching elements and the zero voltage detecting devices that detect whether or not the voltage that is indicated by the cross terminal voltage sensors is zero become unnecessary, several sensors can be eliminated, the circuit structure is simplified, and thereby the cost of the inverter apparatus can be reduced.

Figure 7:
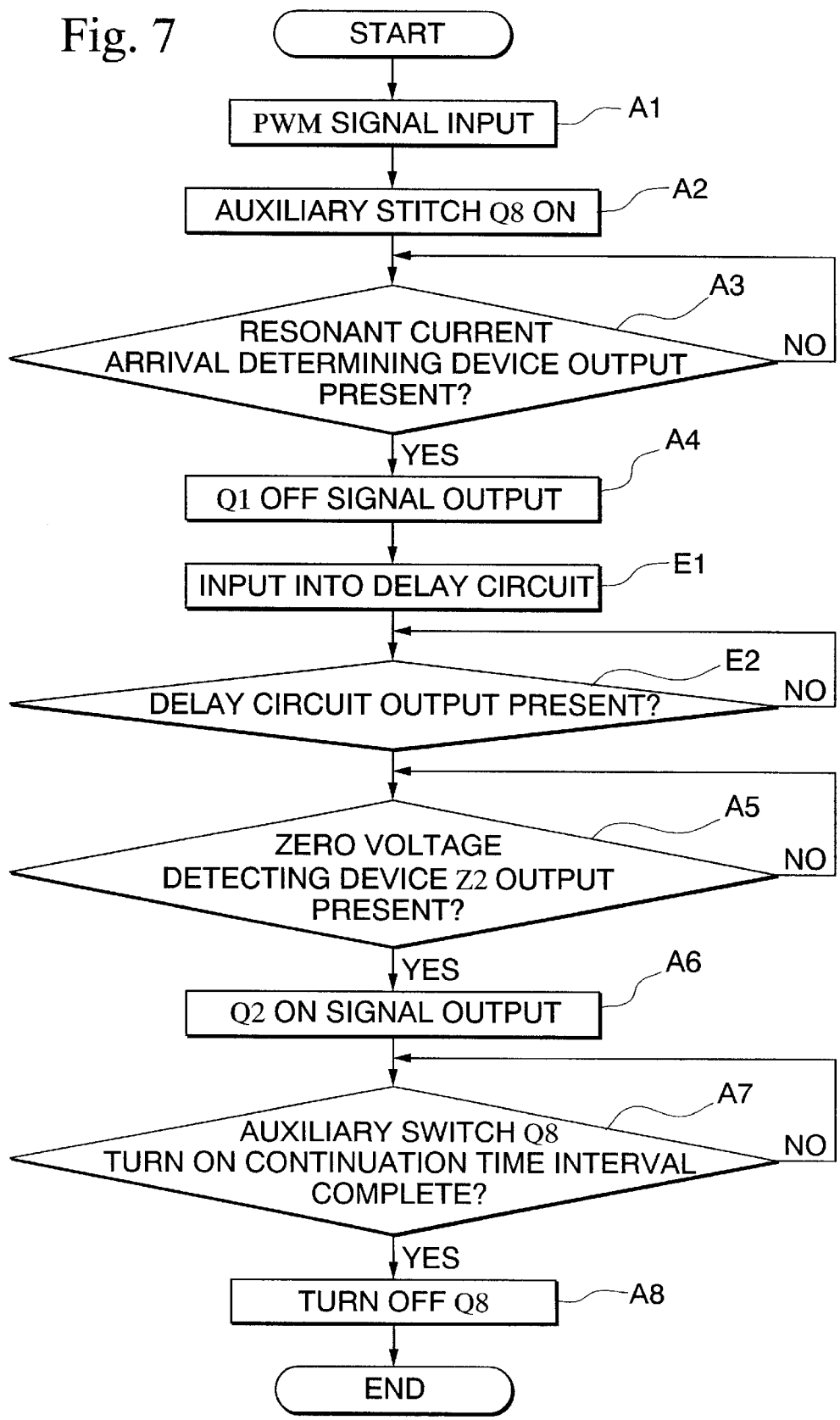
FIG. 7 is a flowchart showing the operation of the inverter control circuit according to the third embodiment of the present invention.

FIG. 7 is a flowchart showing the operation of the inverter control circuit according to the present embodiment. The difference between this flowchart and the flowchart of the first embodiment is that instead of step A5, there are the steps E1 and E2, and the control from step A1 to A4 is identical to that of the first embodiment.

In step E1, an arrival determination signal I output by the resonant current arrival determining device is input into the delay circuit 11. Step E2 waits for the output of a delay timing signal that turns ON the corresponding plus side main switching elements and the minus side main switching elements that function as the plus side main switching elements and minus side main switching elements that are to be made conductive next. In addition, at the point in time that the delay timing signal has been output, a main drive signal is output to the plus side main switching elements and the minus side main switching elements that are to be made conductive next. The control from step A6 to A8, in which the main drive signal is output, is carried out identically to that of the first embodiment, and thereby the main switching elements and the auxiliary switching elements are controlled.

Figure 8:
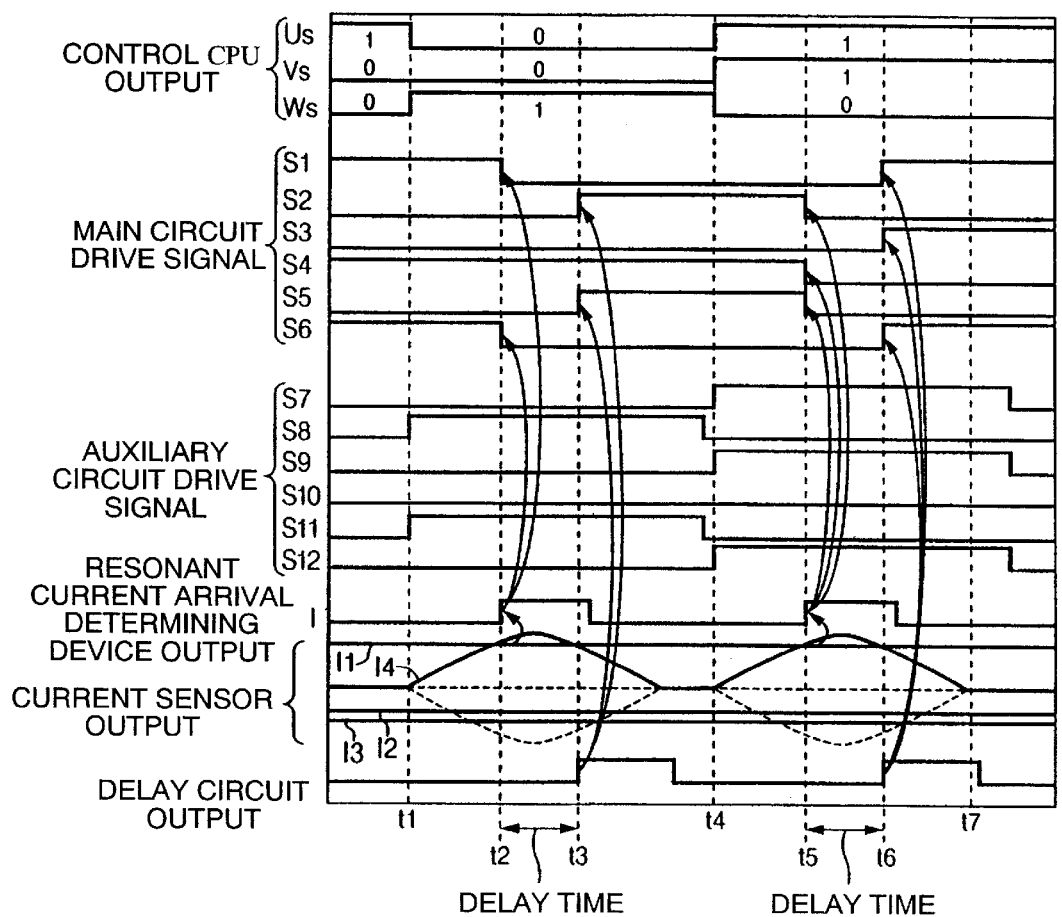
FIG. 8 is a timing chart showing the operation of the inverter apparatus according to the third embodiment of the present invention.

FIG. 8 is a timing chart showing the operation of the inverter apparatus according to the present embodiment.

At time t2, when the resonant current arrival determining device 7 has output the arrival determination signal I and the output arrival determination signal I has been input into the delay circuit 11 in the drive signal generating device 6, this delay circuit 11 starts a timer for a predetermined delay time interval. In addition, at time t3, when the timer of the predetermined delay time interval that has been set in advance has completed, the delay circuit 11 switches the delay timing signal to the drive signal generating circuit 6a from the OFF state "0" to an ON state "1". The drive signal generating device 6 outputs the main drive signals S2 and S5 for turning ON the minus side main switching element Q2 and the plus side main switching element Q5 that are to be made conductive next in synchronism with the timing of the switching of this delay timing signal, and thereby ZVS and ZCS in the minus side main switching element Q2 and the plus side main switching element Q5 are realized.

In addition, at time t5, when the resonant current arrival determining device 7 has output the arrival determination signal I and the output arrival determination signal I has been input into the delay circuit 11 in the drive signal generating device 6, this delay circuit 11 starts a timer for a predetermined delay time interval. In addition, at time t6, when the timer of the predetermined delay time interval that has been set in advance has completed, the delay circuit 11 switches the delay timing signal to the drive signal generating circuit 6a from the OFF state "0" to an ON state "1". The drive signal generating device 6 outputs the main drive signals S1, S3, and S6 for turning ON the plus side main switching elements Q1 and Q3 and the minus side main switching element Q6 that are to be made conductive next in synchronism with the timing of the switching of this delay timing signal, and thereby ZVS and ZCS in the plus side main switching element Q1 and Q3 and the minus side main switching element Q6 are realized.

Figure 9:
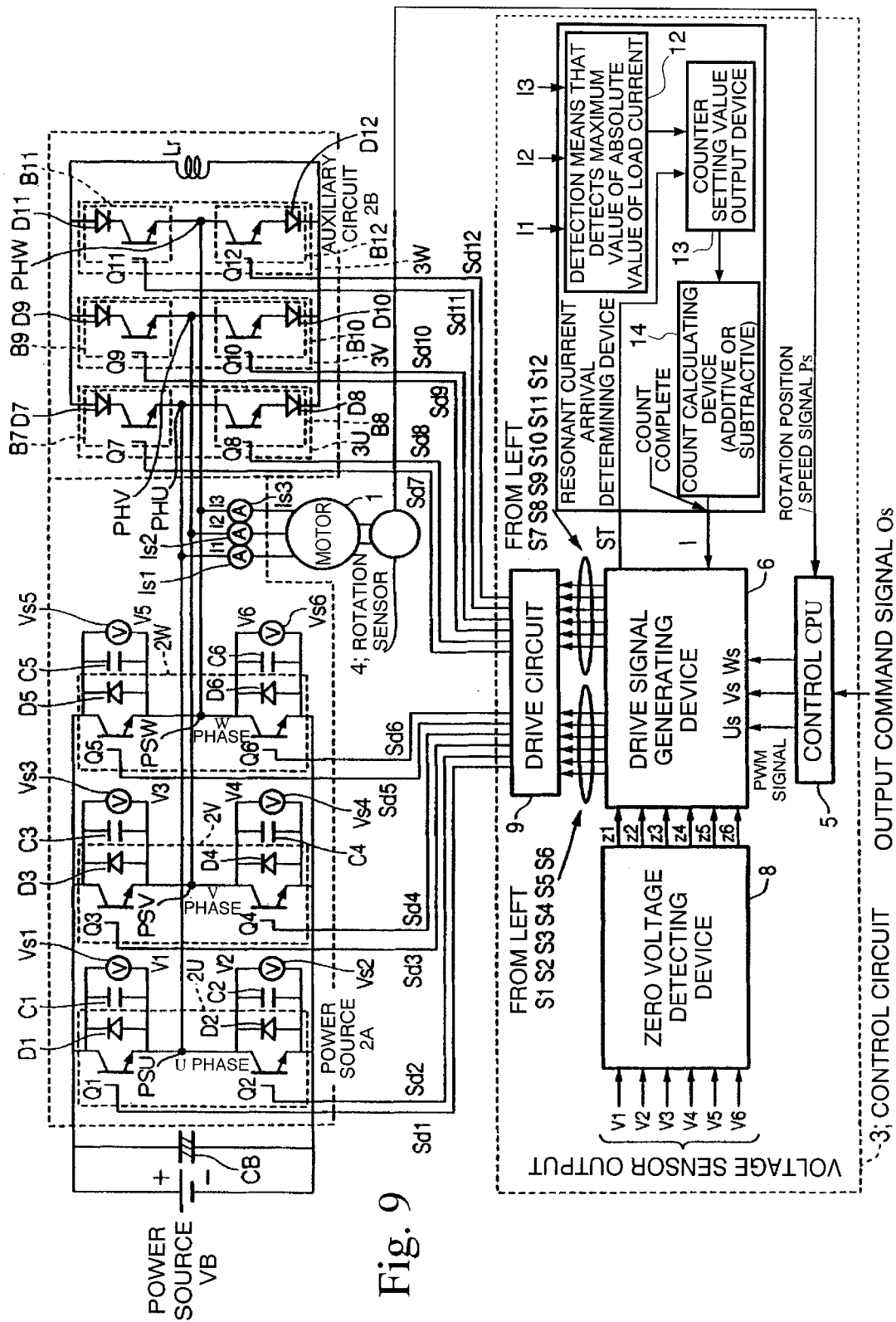
FIG. 9 is a circuit diagram showing the structure of the inverter control circuit according to the fourth embodiment of the present invention.

FIG. 9 is a circuit diagram showing the structure of the inverter control circuit according to the fourth embodiment of the present invention. This embodiment differs from the first embodiment as follows.

First, cross terminal voltage sensors Vs2, Vs4, and Vs6 are provided between the collectors and emitters of the minus side main switching elements Q2, Q4, and Q6, not just between the collectors and emitters of the plus side main switching elements Q1, Q3, and Q5. In addition, the power source voltage sensor VBs and the resonant current sensor Is4 for detecting the resonant current (the current flowing into the inductor Lr) are not provided. Finally, the voltage difference calculating device 10 is not provided.

Furthermore, the resonant current arrival determining device 7 comprises a maximum value detecting device 12 that detects the maximum value of the absolute values of the load current, a counter setting value outputting device 13, and a counter calculating device 14.

The maximum value detecting device 12 detects the maximum values of the absolute values of the load currents I1, I2, and I3 detected by the load current sensors Is1, Is2, and Is3 in the main circuit 2A.

The counter setting value output device 13 outputs the counter setting value that depends on the maximum value detected by the maximum value detecting device 12.

The counter calculating device 14 outputs the arrival determination signal I after the passage of a time interval that depends on the counter setting value output by the counter setting value output device 13 after the output of the predetermined switching timing signal ST.

The counter calculating device 14 is activated by a frequency higher than the switching frequency for a switching element, and increments or decrements the counter value. In the case of using an addition method, the counter calculating device 14 outputs the arrival determination signal I that indicates the count completion when a count value that starts the count from zero reaches the counter setting value. In the case of using a decrementing method, the count calculating device 14 outputs an arrival determination value I that indicates the count completion when a count value that starts the count from the count setting value reaches zero. In addition, the arrival determination signal I output by the count calculating device 14 becomes the output signal of the resonant current arrival determining device 7.

The timing that starts the count is determined by the predetermined switching timing signal ST output from this drive signal generating device 6 when the PWM signals Us, Vs, and Ws input into the drive signal generating device 6 change.

According to this embodiment, the resonant sensors for detecting the resonant current become unnecessary.

In addition, according to the conventional method, because at several $\mu$ seconds the response speed of the current sensor is extremely slow, and using the auxiliary circuit 2B that operates at several $\mu$ seconds for measurement is extremely difficult, the error with respect to the actual current is extremely large.

However, according to the present embodiment, the resonant current arrival determining device 7 outputs the arrival determination signal I based on the load currents I1, I2, and I3 that change extremely slowly in comparison to the resonant operation in the auxiliary circuit 2B, and thus the influence of the delay in the response of the current sensor can be eliminated, and the precision of the determination operation of the resonant current arrival determining device can be improved.

Figure 10:
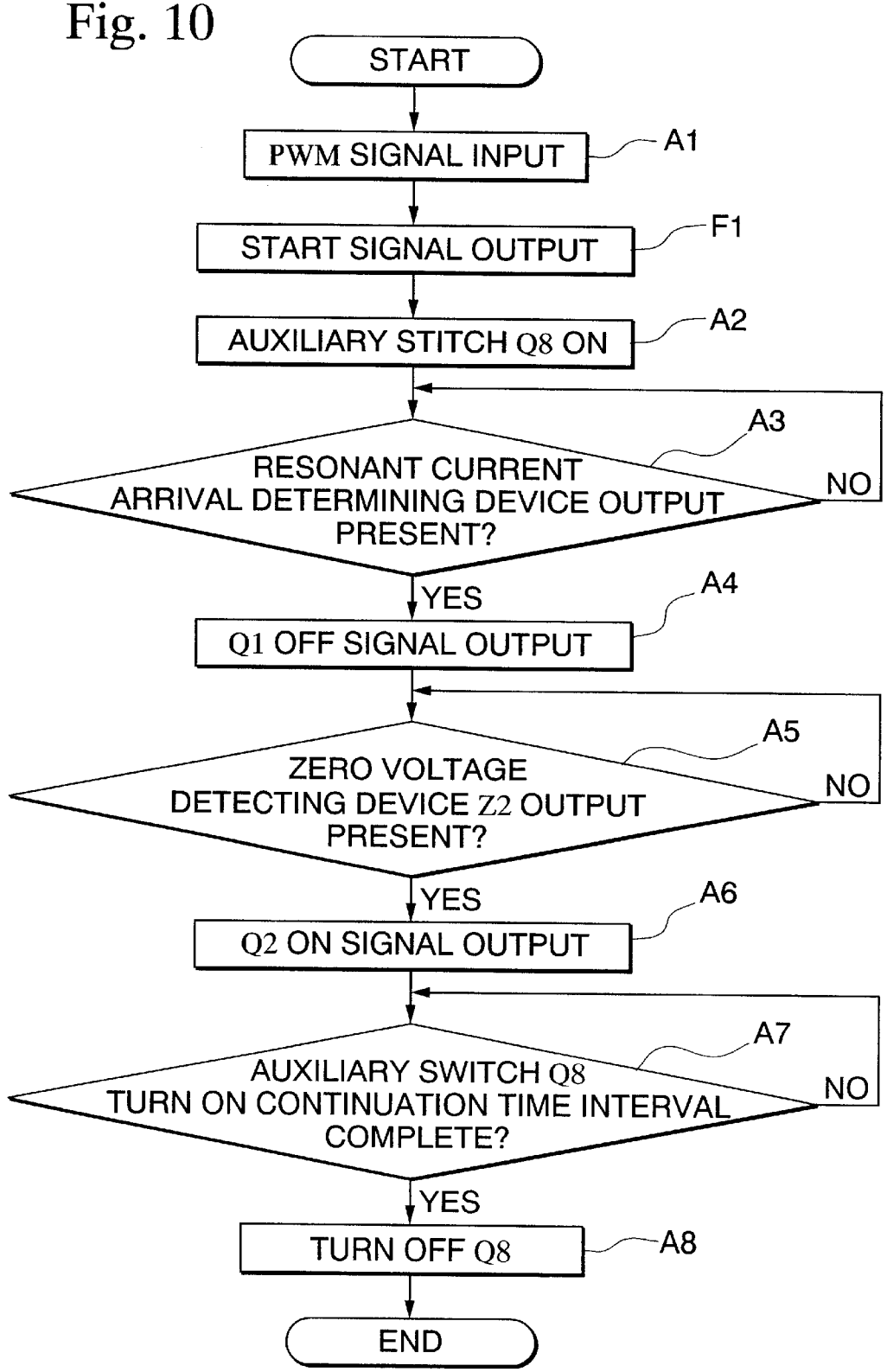
FIG. 10 is a flowchart showing the operation of the inverter apparatus according to the fourth embodiment of the present invention.

FIG. 10 is a flowchart that shows the operation of the inverter apparatus according to the present embodiment. This flowchart differs from that of the first embodiment in that step F1 is between step A1 and step A2.

In step F1, the drive signal generating device 6 outputs the predetermined switching timing signal ST output in synchronism with the ON/OFF timing of the PWM signal, the output predetermined switching timing signal ST is input into the counter setting value output device 13 of the resonant current arrival determining device 7, and the counter calculating device 14 starts the count operation based on the counter setting value set by the counter setting value output device 13.

In step A3, like the first embodiment, the resonant current arrival determining device 7 detects whether or not the arrival determination signal I has been output, but the resonant current arrival determining device 7 of the present embodiment outputs this arrival determination signal I when the counter calculating device 14 in the resonant current arrival determining device 7 outputs the arrival determination signal I that indicates the completion of the count.

Figure 11:
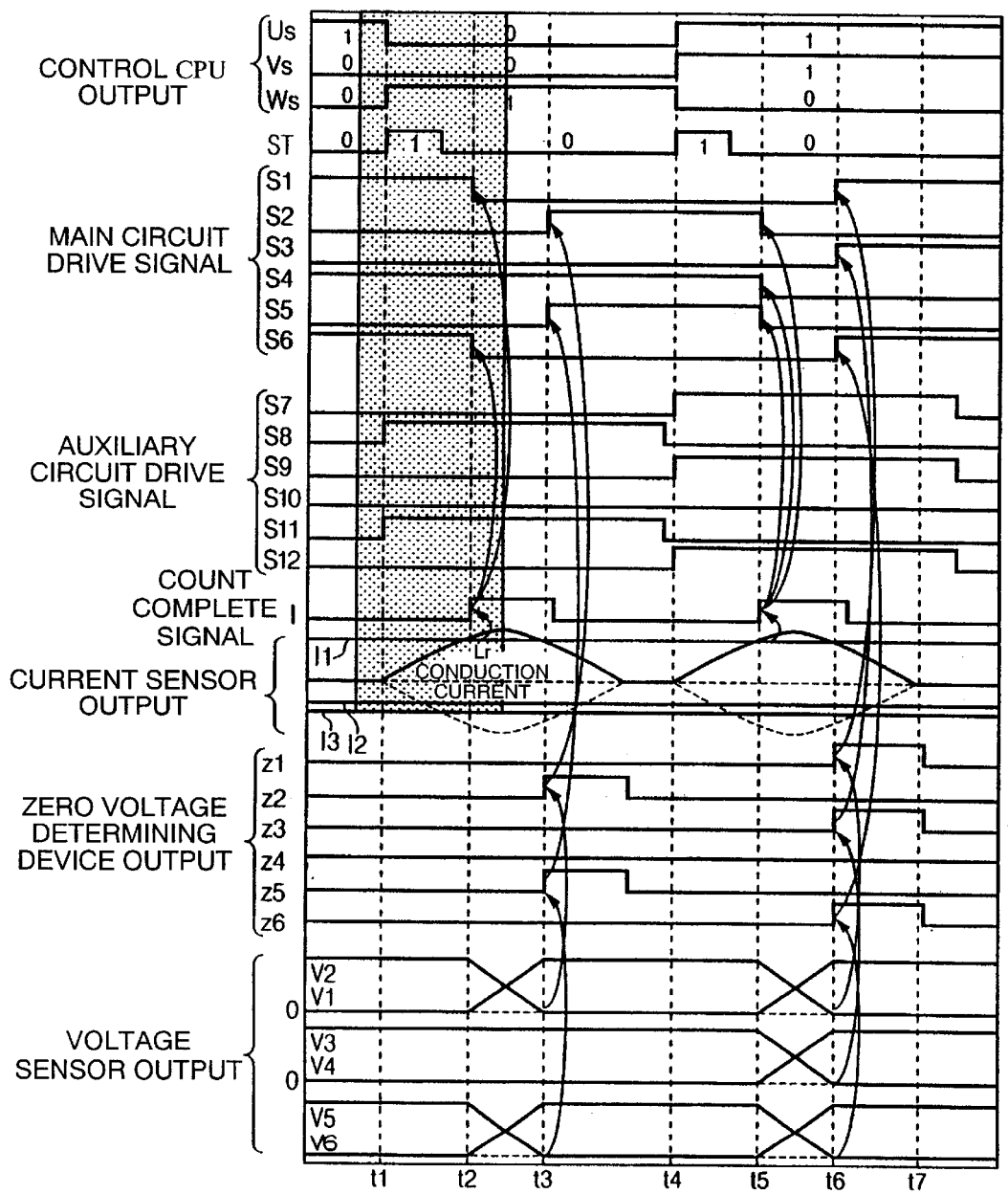
FIG. 11 is a timing chart showing the operation of the inverter apparatus according to the fourth embodiment of the present invention.

FIG. 11 is a timing chart showing the operation of the inverter apparatus according to the present embodiment.

At time t1, the drive signal generating device 6 outputs the predetermined switching timing signal ST (where ST is "1") at the same time that the PWM signals Us and Ws sent from the control CPU 5 change, and the output predetermined switching timing signal ST is input into the counter setting value output device 13 of the resonant current arrival determining device 7. Thereby, the counter setting value output device 13 sends the counter setting value to the count calculating device 14, and this count calculating device 14 starts the count.

At time t2, when the count calculating device 14 has completed the count, the count calculating device 14 outputs the arrival determination signal I that indicates the count completion, and the output arrival determination signal I is input into the drive signal generating device 6. Thereby, the drive signal generating device 6 turns OFF the main drive signals S1 and S6.

From time 4 to time t5, operations similar to those of time t1 and time t2 are carried out.

Figure 12:
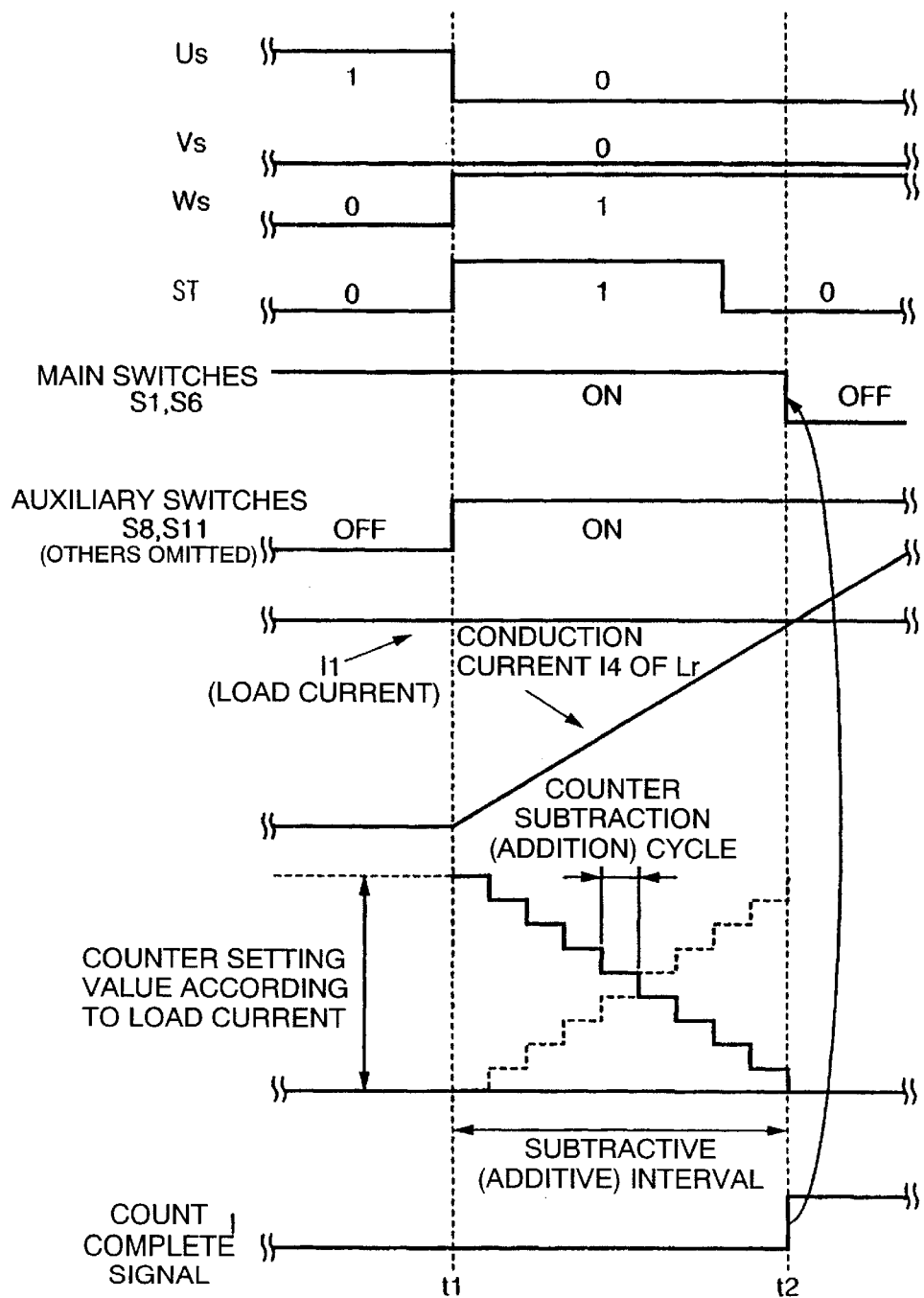
FIG. 12 is a timing chart showing the detailed operation of the inverter apparatus according to the fourth embodiment of the present invention.

FIG. 12 is a timing chart showing the detailed operation of the inverter apparatus according to this embodiment. In this timing chart, the operation during the interval from time t1 to time t2 is shown.

At time t1, the drive signal generating device 6 outputs the predetermined switching signal ST (where ST is "1") at the same time that the PWM signals Us and Ws sent from the control CPU 5 change, and the output predetermined switching timing signal ST is input into the counter setting output device 13 in the resonant current arrival determining device 7. Thereby, the counter setting value output device 13 sends the counter setting value to the counter calculating device 14.

Depending on the load current (for example, I1), the counter setting value is determined by the maximum value detecting device 12 that detects the absolute value of the maximum value of the load current.

In addition, the counter calculating device 14 starts the count based on the counter setting value determined by the maximum value detecting device 12. For example, in the case of an addition counter, the counter calculating device 14 uses the counter setting value as the initial value, and decrements it.

In addition, at time t2, when the counter calculating device 14 completes the decrementing (the count value becomes "0"), the count calculating device 14 outputs the arrival determination signal I indicating the count completion, and the output arrival determination signal I is input into the drive signal generating device 6. Thereby, the drive signal generating device 6 turns OFF the main drive signals S1 and S6.

From time t1 to time t2, the resonant current I4 flowing through the inductor Lr rises, and at time t2, exceeds the load current I1.

Figure 13:
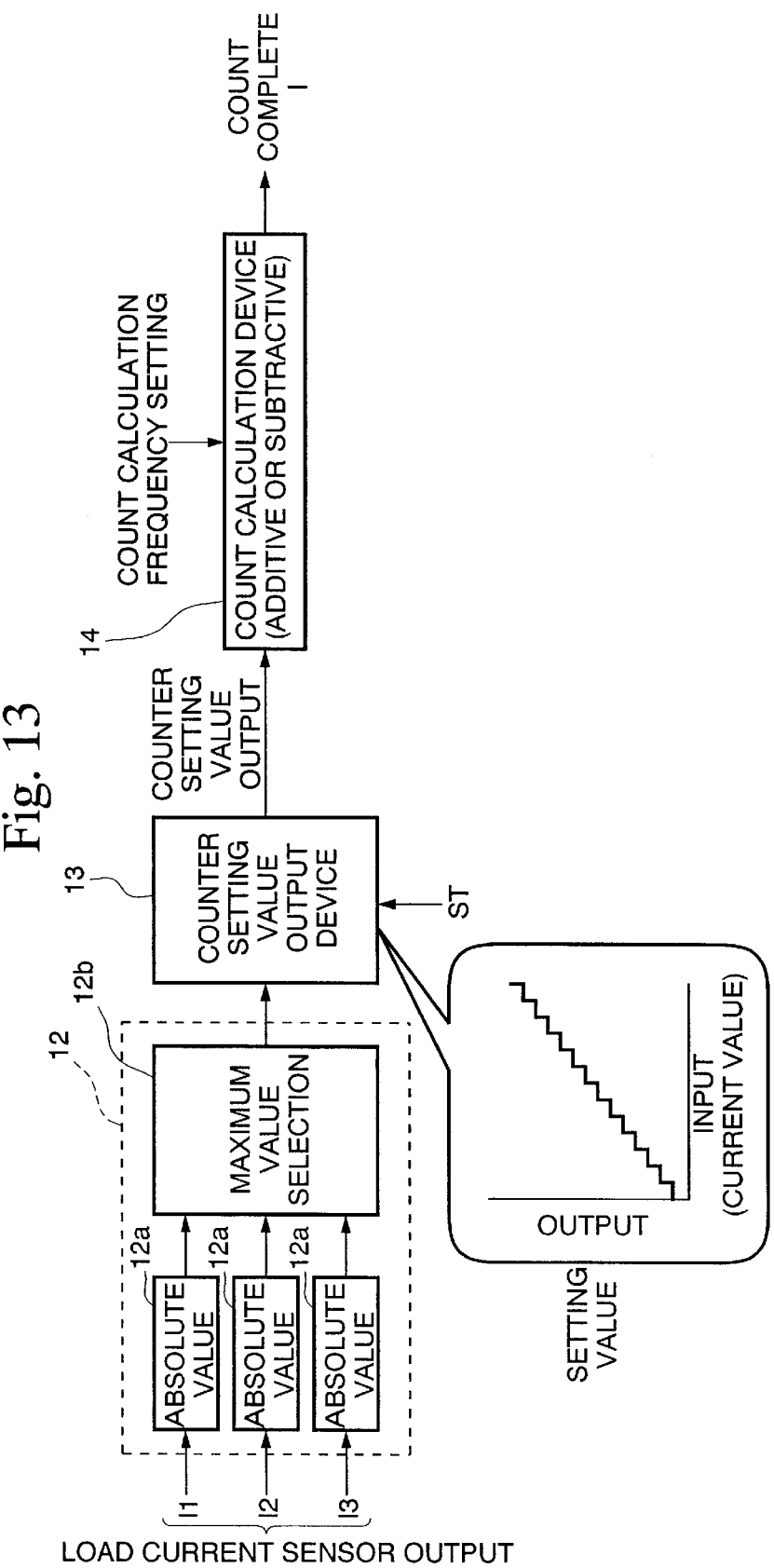
FIG. 13 is a block diagram showing the detailed internal structure of the resonant current arrival determining device 7 according to the fourth embodiment of the present invention.

FIG. 13 is a block diagram showing the detailed internal structure of the resonant current arrival determining device 7 in the present embodiment. The maximum value determining device 12 that determines the absolute value of the maximum value of the load current comprises the absolute value conversion circuit 12a that outputs the absolute value of the load current that alternates between plus and minus, and a maximum value selection circuit 12b that selects the maximum output value, and the output of the maximum value selection circuit 12b is sent to the counter setting value output circuit 13 (the counter setting value output device). The counter setting value sent from the counter setting value output device 13 to the count calculating device 14 is the value corresponding to the time required for the resonant current to attain a value sufficient to make the cross terminal voltage of the main switching element zero (the value that adds an amount of tolerance to the load current) after the auxiliary switching element is turned ON when the power source voltage is the lowest operating voltage. That is, the value that allots this time interval at the cycle of the clock when the count calculating device 14 carries out the count is the counter setting value. Specifically, the counter setting value is set for each load current.

Figure 14:
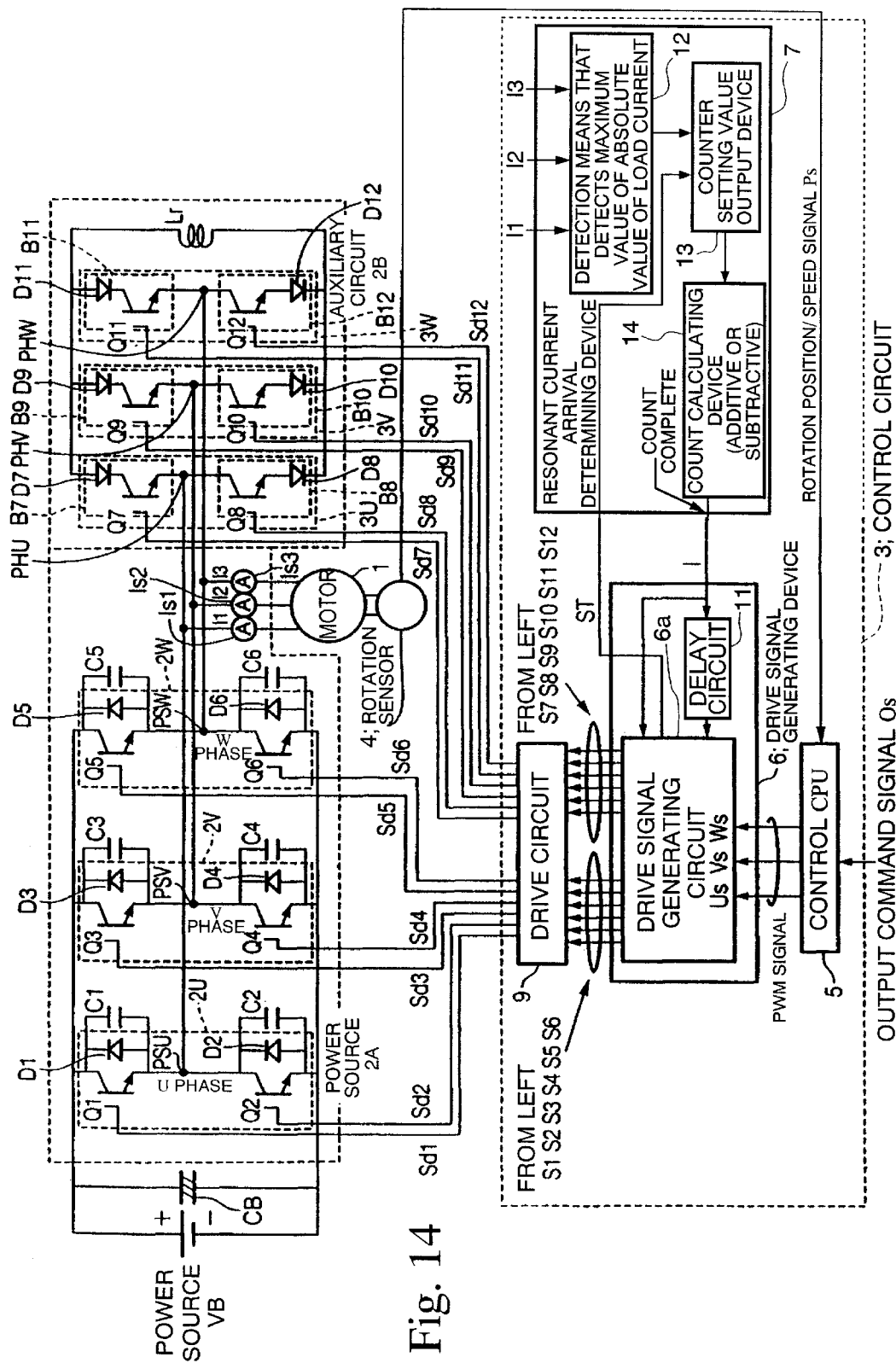
FIG. 14 is a circuit diagram showing the structure of the inverter apparatus according to a fifth embodiment of the present invention.

FIG. 14 is a circuit diagram showing the structure of the inverter apparatus according to a fifth embodiment of the present invention. The inverter apparatus according to the present embodiment provides together the delay circuit in the drive signal generating device 6 according to the third embodiment shown in FIG. 6, the maximum value detecting device 12 that detects the absolute value of the maximum value of the load current in the resonant current arrival determining device 7, the counter setting value output device 13, and the count calculating device 14 according to the fourth embodiment shown in FIG. 9.

Therefore, in the inverter apparatus according to the present embodiment, the resonant current sensor Is4 for detecting the resonant current I4 and the power source voltage sensor VBs for detecting the power source voltage Vx, in addition, in each main circuit for the phases 2U, 2V, and 2W, the cross terminal voltage sensors Vs1, Vs3, and Vs5 and Vs2, Vs4, and Vs6 for detecting the cross terminal voltages V1, V3, and V5, and V2, V4, and V6 of the plus side main switching elements Q1, Q3, and Q5 and the minus side main switching elements Q2, Q4, and Q6, and the zero voltage detecting device 8 that detects whether or not the cross terminal voltages V1, V3, and V5, and V2, V4, and V6 detected by the cross terminal voltage sensors Vs1, Vs3, and Vs5 and Vs2, Vs4, and Vs6 become unnecessary.

Therefore, in the inverter apparatus, the sensors for the soft switching do not need to be newly provided, only the load current sensors that are used to drive the motor need to be mounted, and thereby the resonant operation for the inverter apparatus can be realized using only digital circuits that generate signals that follows the conduction timing of the main switching elements and the auxiliary switching elements based on the load current. Therefore, the size and weight of the inverter apparatus can be reduced, and in addition, the cost of the inverter apparatus can be reduced.

Figure 15:
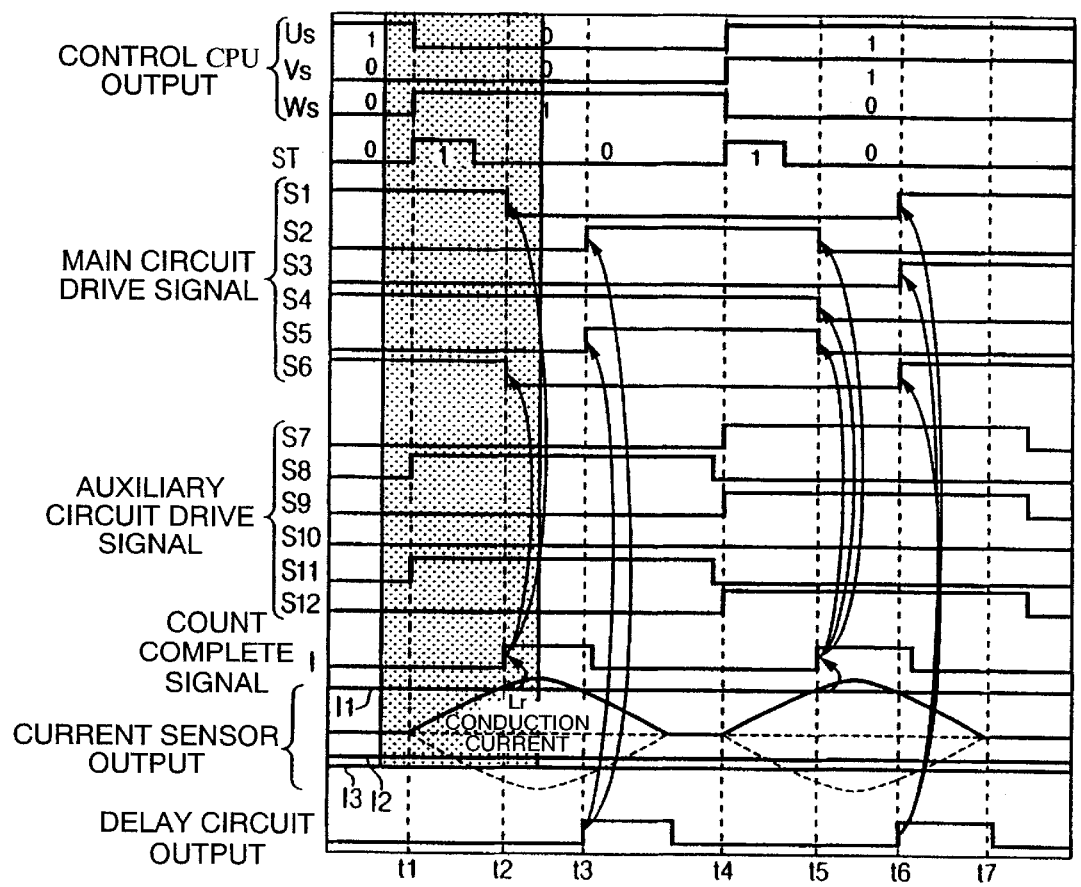
FIG. 15 is a timing chart showing the operation of the inverter apparatus according to the fifth embodiment of the present invention.

FIG. 15 is a timing chart that shows the operation of the inverter apparatus according to the present invention.

Like the fourth embodiment, at time t1, when the drive signal generating device 6 outputs the predetermined switching timing signal ST (where S is "1"), the count calculating device 14 starts the count. In addition, at time t2, when the count calculating device 14 completes the count, the count calculating device 14 outputs an arrival determination signal I that indicates the count completion.

When this arrival determination signal I is input into the delay circuit 11, at time t3, when a predetermined delay time has passed, the drive signal generating device 6 changes the main drive signals S2 and S5 to ON. From time t4 to time t5, operations identical to those from time t1 to time t2 are carried out.

Figure 16:
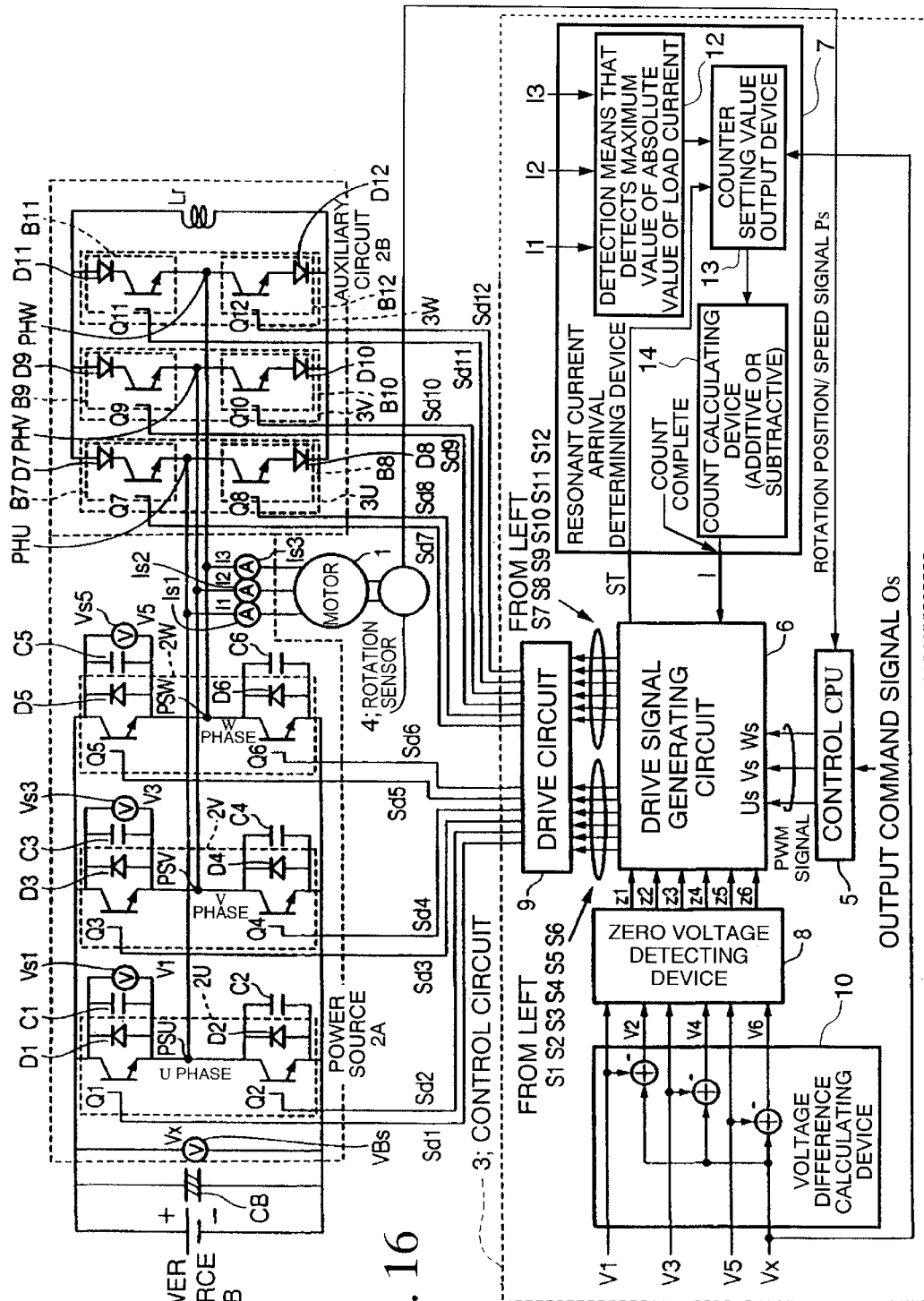
FIG. 16 is a circuit diagram showing the structure of the inverter apparatus according to a sixth embodiment of the present invention.

FIG. 16 is a circuit diagram showing the structure of the inverter apparatus according to the sixth embodiment of the present invention. The inverter apparatus in this embodiment eliminates the minus side cross terminal voltage sensors Vs2, Vs4, and Vs6 in the fourth embodiment shown in FIG. 9, and adds a power source sensor VBs that detects the power source voltage Vx, and a voltage difference calculating device 10 that calculates the differences between the power source voltage Vx and the cross terminal voltages V1, V3, and V5, and the output of the power source voltage sensor VBs is input into the counter setting value output device 13 in the resonant current arrival determining device 7.

The counter setting value output device 13 of the present embodiment calculates a counter setting value that depends on the absolute value of the maximum value of the load current detected by the maximum value detecting device 12, which detects the absolute value of the maximum value of the load current, and the power source voltage Vx detected by the power source voltage sensor VBs, and sends the calculated counter setting value to the count calculating device 14.

Specifically, the counter setting value output device 13 calculates the resonant current that flows into the resonant inductor Lr from the absolute value of the maximum value of the load current and the power source voltage Vx, and the time interval that depends on this calculated current is allotted by the cycle of the clock when the count calculating device 14 carries out the count, and calculates the counter setting value. In addition, the count calculating device 14 inputs the counter setting value calculated by the counter setting value output device 13, and carries out the count based on the input counter setting value.

FIG. 14 is a block diagram showing a detailed internal structure of the resonant current arrival determining device 7 according to the present embodiment.

The counter setting value calculating device 13 finds the arrival time t during which the resonant current attains the absolute value of the maximum value of the load current from the following formula:

$$Ir = Vx/Lxt,$$

where Ir is the target value of the resonant current (substituted by the absolute value of the maximum value of the load current), Vx is the power source voltage, and L is the value of the inductor Lr. In addition, the counter setting value output device 13 uses as the counter setting value the value that is the arrival time t that has been allotted by the cycle of the clock when the count calculating device 14 carries out a count.

Specifically, the counter setting value output device 13 makes possible sending a counter setting value that depends on the fluctuation of the power source voltage Vx to the counter calculating device 14. Like the fourth embodiment, the count calculating device 14 can be carried out using either incrementing or decrementing.

According to the present embodiment, the initial resonant current can be an optimal value that depends on the power source value Vx. Specifically, in the case that the value of the inductor Lr is fixed, the slope of the resonant current I4 flowing into the inductor Lr changes when the resonant current I4 rises. Thus, along with the power source value Vx, the initial current required for resonance is obtained by detecting the maximum value of the load current I4. Thereby, the initial resonant value can be made an optimal value. Therefore, reliable zero voltage switching becomes possible. Moreover, the power source voltage VBs can be used for other control, for example, in an EV, HEV, or the like, and thus the power source sensor VBx does not have to be newly provided, and there is no increase in cost.

Figure 17:
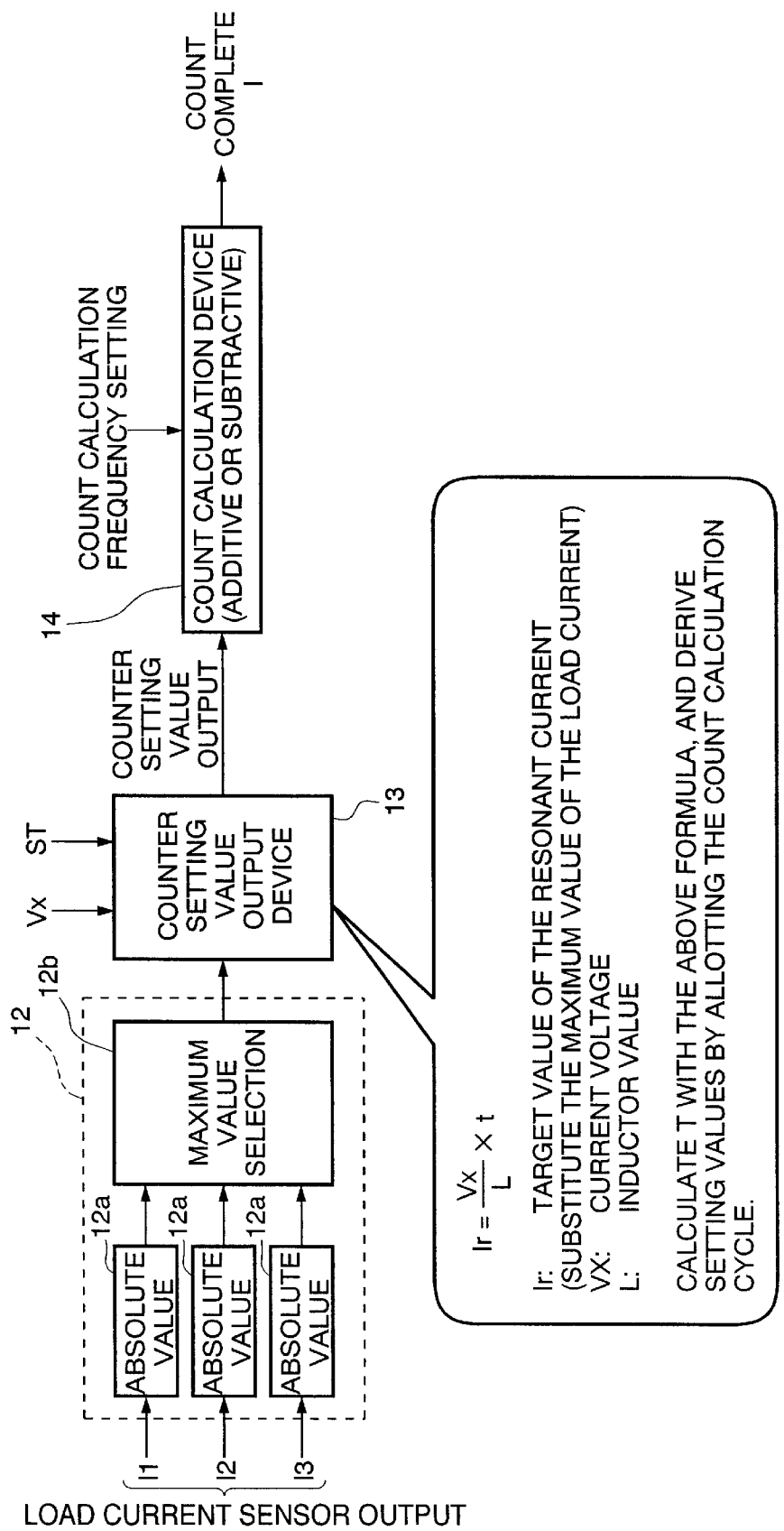
FIG. 17 is a block diagram showing the detailed internal structure of the resonant current arrival determining device 7 according to the sixth embodiment of the present invention.
Figure 18:
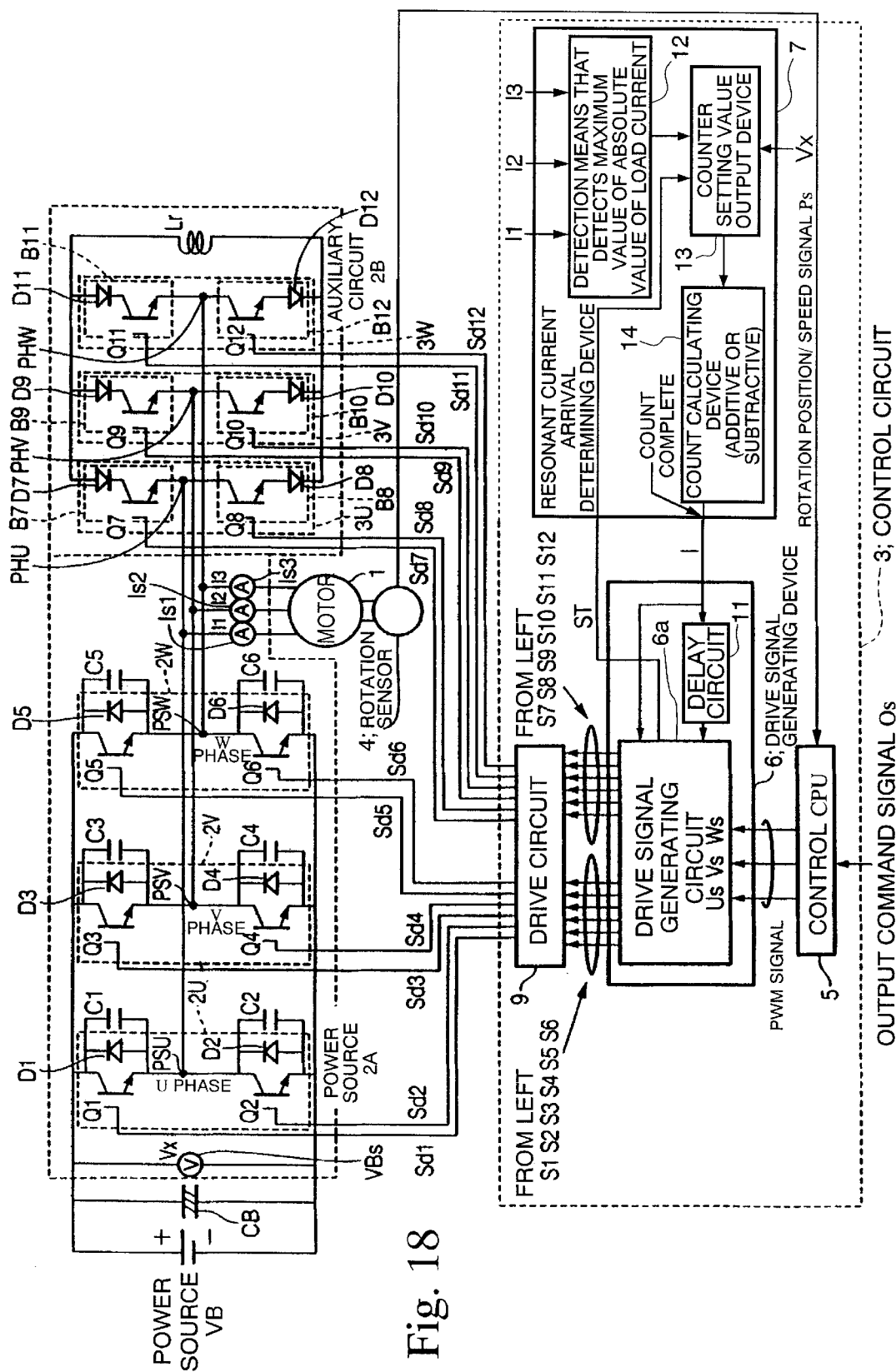
FIG. 18 is a circuit diagram showing the structure of the inverter control circuit according to a seventh embodiment of the present invention.
Figure 19:
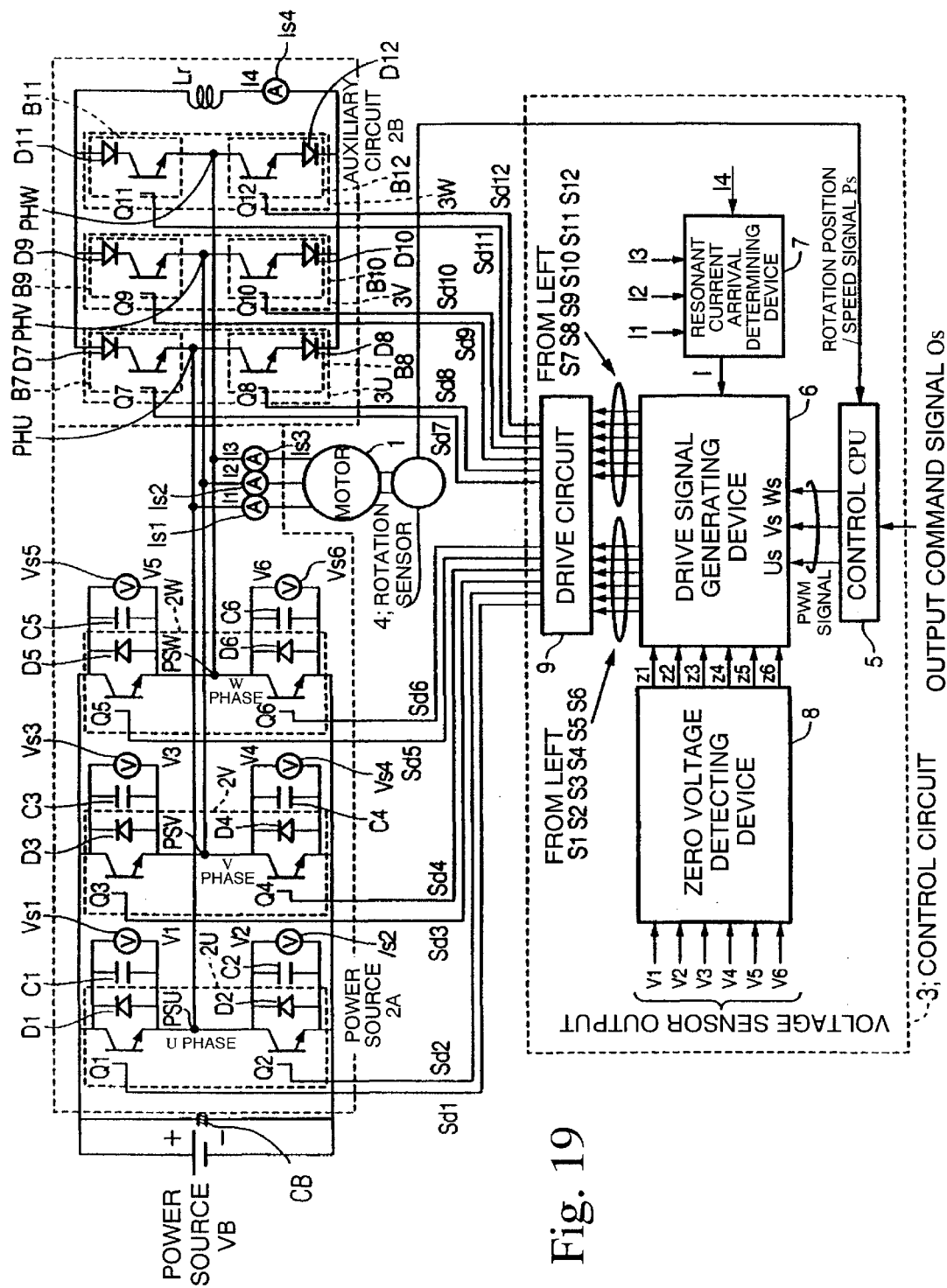
FIG. 19 is a circuit diagram showing the structure of a conventional collective resonant snubber inverter apparatus.

FIG. 15 is a circuit diagram showing the structure of the inverter control circuit according to a seventh embodiment of the present invention. The inverter apparatus of the present embodiment provides the delay circuit 11 explained in the fifth embodiment shown in FIG. 14 in the drive signal generating device 6 in the sixth embodiment of the inverter apparatus shown in FIG. 16, and thereby a structure is realized in which the cross terminal voltage sensors that detect the cross terminal voltages between the plus side main switching elements and the minus side main switching elements become unnecessary, as shown in FIG. 17.

Moreover, in each of the embodiments described above, three load current sensors were provided, but a structure is possible in which two load current sensors are provided. A two phase load current is detected, and the remaining one phase is found from the difference between the detected values of the two phases.

According to the present invention, in the first invention, the absolute value of the maximum value of the load current detected by the load current sensor in the inverter circuit, the counter setting value output device outputs a counter setting value that depends on the absolute value of the maximum value of the load current, and the count calculating device outputs an arrival determination signal after the passage of a time interval that depends on the counter setting value output by the counter setting value output device after the drive signal generating device outputs a predetermined switching timing signal.

In addition, when the resonant current arrival determining device outputs the arrival determination signal, the drive signal generating device generates a main drive signal that turns OFF the corresponding plus side main switching elements and the minus side main switching elements in the inverter circuit.

Therefore, the resonant current sensors for detecting the resonant current that are required in the conventional technology become unnecessary.

In addition, in the second invention, the delay circuit generates a main drive signal that turns ON the corresponding plus side main switching elements and the minus side main switching elements in the inverter circuit after the passage of a predetermined time interval after the resonant current arrival determining device outputs the arrival determination signal. Thereby, in addition to the resonant current sensor for detecting the resonant current and the power source voltage sensor for detecting the power source voltage, the cross terminal voltage sensors for detecting the cross terminal voltages of plus side main switching elements and minus side main switching elements in each main circuit of each phase, and the zero voltage detecting devices for detecting whether or not the cross terminal voltages detected by the cross voltage sensors are zero become unnecessary.

In addition, in the third invention, the size of the initial resonant current that forces conduction in the auxiliary circuit during the resonant operation can be controlled by an optimal value that depends on the power source voltage.

In addition, in the fourth invention, the delay circuit generates a main drive signal that turns ON the corresponding plus side main switching elements and the minus side main switching elements in the inverter circuit after the passage of a predetermined time interval after the resonant current arrival determining device outputs the arrival determination signal. Thereby, the cross terminal voltage sensors that detect the cross terminal voltages between the plus side main switching element and the minus side main switching element in the main circuit for each phase and the zero voltage detecting devices that detects whether or the cross terminal voltage detected by these cross terminal voltage sensors are zero become unnecessary. Therefore, the cost of the inverter apparatus can be reduced.

In addition, in the fifth invention, the cross terminal voltage sensors detect the cross terminal voltages of the plus side main switching elements and the minus side main switching elements in each main circuit for each phase, the power source voltage sensor detects the power source voltage output by the power source, and the voltage difference calculating device calculates the difference voltage, which is the difference between the power source voltage detected by the power source voltage sensors in the inverter circuit and the cross terminal voltage detected by the cross terminal voltage sensors. Therefore, in comparison to the conventional technology, the number of voltage sensors is decreased by two.

In addition, in the sixth invention, in comparison to the conventional technology, the number of voltage sensors is decreased by two, and the resonant current sensor for detecting resonant current becomes unnecessary.

In addition, in the seventh invention, in the inverter apparatus of the sixth invention, the size of the initial resonant current that forces conduction in the auxiliary circuit during resonant operation can be made an optimal value that depends on the power source voltage.

What is claimed is:

1. A resonant inverter apparatus, which is an inverter apparatus comprising an inverter circuit that supplies a direct current output by a power source to a motor after being converter to three-phase alternating current; a resonant circuit that is connected to the output terminal of the inverter circuit; and a control circuit that controls the resonant circuit and the inverter circuit, wherein:

said inverter circuit comprises a three phase main circuit in which three main circuits, one for each phase, are connected in parallel, wherein, in a main circuit, a plus side main switching element that is connected to the plus terminal of said power source and the minus side main switching element that is connected to the minus terminal of said power source are connected in series, and the plus side switching element and the minus side switching element are connected in parallel to diodes; resonant capacitors that are connected in parallel to the plus side main switching element and the minus side main switching element in each circuit for each phase; and load current sensors that detect a load current flowing between main connection points, at which the plus side main switching element and the minus side main switching element in each circuit for each phase are connected together, and the motor;

said resonant circuit comprises a three-phase auxiliary circuit in which three auxiliary circuits, one for each phase, are connected in parallel, wherein the outflow auxiliary switching elements and the inflow auxiliary switching elements that force a current to pass only in one direction and are connected in parallel, and the auxiliary connection points that connect the inflow auxiliary switching element and the outflow auxiliary switching element in each auxiliary circuit for each phase are connected to said main connection points; and a resonant inductor that is connected in parallel to said auxiliary circuits for each phase;

said control circuit comprises a resonant current arrival determining device that determines whether or not a resonant current in said resonant circuit is larger than a resonant current detected by said load current sensors and in the case that it is larger outputs an arrival determination signal; and a drive signal generating device that generates a main drive signal that turns OFF the plus side main switching elements and the minus side switching elements to be made non-conductive next when the resonant current arrival determination device has output an arrival determination signal, generates an auxiliary drive signal that turns ON the outflow side auxiliary switching element and the inflow side auxiliary switching element at a predetermined switching timing, and generates an auxiliary drive signal that turns OFF said outflow side auxiliary switching element and said inflow side auxiliary switching element after the passage of a predetermined ON continuation time after the predefined switching timing; and a resonant current arrival determining device comprising a maximum value detecting device that detects the absolute value of the maximum value of said load current, a counter setting value output device that outputs a counter setting value corresponding to said maximum value; and a count calculation device that outputs the arrival determination signal after the passage of a time interval that depends on the counter setting value output by said counter setting value output device after said drive signal generating device outputs a predetermined switching timing signal.

2. A resonant inverter apparatus according to claim 1 wherein said drive signal generating apparatus comprises a delay that, after the passage of a predetermined time interval after said resonant current arrival determining device outputs an arrival determination signal, generates a delay timing signal that turns ON the plus side main switching elements and the minus side main switching elements that are to be made conductive next.

3. A resonant inverter apparatus according to claim 1 or claim 2 wherein:

said inverter circuit comprises a power source voltage sensor that detects the power source voltage output by said power source; and said counter setting value output device calculates said counter setting value based on the maximum value detected by said maximum value detecting device and the power source voltage detected by said power source voltage sensor.

4. A resonant inverter apparatus, which is an inverter apparatus comprising an inverter circuit that supplies a direct current output by a power source to a motor after being converted to a three phase alternating current, a resonant circuit that is connected to the output terminal of this inverter circuit, and a control circuit that controls this resonant circuit and said inverter circuit, wherein:

said inverter circuit comprises a three phase main circuit in which three main circuits, one for each phase, are connected in parallel, wherein, in a main circuit, a plus side main switching element that is connected to the plus terminal of said power source and the minus side main switching element that is connected to the minus terminal of said power source are connected in series, and the plus side switching element and the minus side switching element are connected in parallel to diodes; resonant capacitors that are connected in parallel to the plus side main switching element and the minus side main switching element in each circuit for each phase; and load current sensors that detect a load current flowing between main connection points, at which the plus side main switching element and the minus side main switching element in each circuit for each phase are connected together, and the motor;

said resonance circuit comprises a three phase auxiliary circuit in which three auxiliary switching elements, one for each phase, are connected in parallel, wherein an outflow side auxiliary switching element and an inflow side auxiliary switching element that cause the current to flow only in a single direction, are connected serially, and the auxiliary connection points at which the inflow auxiliary switching element and the outflow auxiliary switching element in each auxiliary circuit for each phase are connected is connected to said main connection point; a resonance inductor connected in parallel to said auxiliary circuit for each phase; and a resonance current sensor that detects the resonant current flowing into the inductor;

said control circuit comprises a resonant current arrival determining device that determines whether or not the resonant current detected by said resonant current sensor is larger than the load current detected by said load current sensor, and in the case that it is larger, outputs an arrival determination signal; and a drive signal generating device that generates a main drive signal that turns OFF the plus side main switching elements and the minus side main switching elements that are to be made non-conductive next when the resonant current arrival determining device outputs an arrival determination signal, generates an auxiliary drive signal that turns ON the outflow side auxiliary switching elements and the inflow side auxiliary switching elements of said resonant circuit at a predetermined switching timing, and generates an auxiliary drive signal that turns OFF the outflow auxiliary switching element and the inflow side auxiliary switching element in the resonant circuit that are to be made non-conductive next after the passage of a predetermined ON continuation time from the predetermined switching timing;

said drive signal generating device comprises a delay circuit that generates a delay timing signal that turns ON the plus side main switching element and the minus side main switching element that are to be made conductive next after the passage of a predetermined time interval after said resonant current arrival determining device outputs an arrival determination signal.

5. A resonant inverter apparatus, which is an inverter apparatus comprising an inverter circuit that supplies a direct current output by a power source to a motor after being converted to a three phase alternating current, a resonant circuit that is connected to, the output terminal of this inverter circuit, and a control circuit that controls this resonant circuit and said inverter circuit, wherein:

said inverter circuit comprises a three phase main circuit in which three main circuits, one for each phase, are connected in parallel, wherein, in a main circuit, a plus side main switching element that is connected to the plus terminal of said power source and the minus side main switching element that is connected to the minus terminal of said power source are connected in series, and the plus side switching element and the minus side switching element are connected in parallel to diodes; resonant capacitors that are connected in parallel to the plus side main switching element and the minus side main switching element in each circuit for each phase; a load current sensor that detects a load current flowing between main connection points, at which the plus side main switching element and the minus side main switching element in each circuit for each phase are connected together, and the motor; a cross terminal voltage sensors that detect the cross terminal voltages of the plus side main switching element and the minus side main switching element in each main circuit for each phase; and a power source voltage sensor that detects the power source voltage output by the power source;

said resonant circuit comprises a three-phase auxiliary circuit in which three auxiliary circuits, one for each phase, are connected serially to the outflow auxiliary switching elements and the inflow auxiliary switching elements that allow a current to pass only in one direction and are connected in parallel, and the auxiliary connection points that connect the inflow auxiliary switching element and the outflow auxiliary switching element in each auxiliary circuit for each phase are connected to the main connection points; and a resonant inductor that is connected in parallel to the auxiliary circuits for each phase; and said control circuit comprises:

a voltage difference calculating device that calculates the difference voltage, which is the difference between said power source voltage and the cross terminal voltages detected by each of the cross terminal voltage sensors;

a zero voltage detecting device that detects whether or not said difference voltage and the cross terminal voltage is zero, and in the case that it is zero, outputs a zero voltage detection signal; and a drive signal generating device that generates a main drive signal that turns ON the plus side main switching elements and the main side main switching elements that are to be made conductive next when the zero voltage detecting device outputs the zero voltage detection signal, generates an auxiliary drive signal that turns ON said outflow side auxiliary switching element and said inflow side auxiliary switching element at a predetermined switching timing, and generates an auxiliary drive signal that turns OFF the outflow side auxiliary switching elements and the inflow side auxiliary switching elements to be made non-conductive next after the passage of a predetermined ON continuation time from the predetermined switching timing.

6. A resonant inverter apparatus according to claim 1 wherein:

said inverter circuit comprises a cross terminal sensor that detects the cross terminal voltage of the plus side main switching element and the minus side main switching element in each main circuit for each phase and a power source voltage sensor that detects the power source voltage output by the power source;

said control circuit comprises a voltage difference calculating device that calculates the difference voltage, which is the difference between the power source voltage and the cross terminal voltage detected by each of the cross terminal voltage sensors, and a zero voltage detecting device that detects whether or not the difference voltage and the cross terminal voltage are zero, and in the case that they are zero outputs a zero voltage detection signal; and said resonant current arrival determining device generates a main drive signal that turns OFF the plus side switching element and the minus side main switching element to be made non-conductive next when an arrival determination signal has been output; and a drive signal generating device that outputs a main drive signal that turns ON the plus side main switching elements and the minus main side main switching elements that are to be made conductive next when said resonant voltage arrival determining device outputs said zero voltage detection signal, generates an auxiliary signal that turns ON the plus side main switching elements and the minus side main switching elements at a predetermined switching timing, and generates an auxiliary drive signal that turns OFF the outflow side auxiliary switching elements and the inflow side auxiliary switching elements that are to be made non-conductive next after the passage of a predetermined ON continuation time from the predetermined switching timing.

7. A resonant inverter apparatus according to claim 6 wherein said counter setting value is calculated based on the maximum value detected by said maximum value detecting device and the power source voltage detected by said power source voltage sensor.

* * * * *